United States Patent
Akselrod et al.

(10) Patent No.: US 7,141,804 B1
(45) Date of Patent: Nov. 28, 2006

(54) DETECTION OF NEUTRONS AND HEAVY CHARGED PARTICLES

(75) Inventors: Mark Akselrod, Stillwater, OK (US);
R. Craig Yoder, Glenwood, IL (US);
Gleb Akselrod, Stillwater, OK (US)

(73) Assignee: Landauer, Inc., Glenwood, IL (US)

( * ) Notice: Subject to any disclaimer, the term of this patent is extended or adjusted under 35 U.S.C. 154(b) by 0 days.

(21) Appl. No.: 10/991,456

(22) Filed: Nov. 19, 2004

Related U.S. Application Data

(60) Provisional application No. 60/540,322, filed on Feb. 2, 2004.

(51) Int. Cl.
*G01J 1/58* (2006.01)

(52) U.S. Cl. .................. 250/483.1; 250/485.5

(58) Field of Classification Search ............. 250/483.1, 250/484.5
See application file for complete search history.

(56) References Cited

U.S. PATENT DOCUMENTS

| | | | |
|---|---|---|---|
| 3,293,433 A * | 12/1966 | Ryosuke et al. | 250/484.5 |
| 3,904,532 A * | 9/1975 | Christgau et al. | 250/483.1 |
| 4,638,163 A | 1/1987 | Braunlich et al. | |
| 4,825,084 A | 4/1989 | Braunlich et al. | |
| 4,839,518 A | 6/1989 | Braunlich et al. | |
| 5,015,855 A | 5/1991 | Braunlich et al. | |
| 5,057,693 A | 10/1991 | Burgkhardt et al. | |
| 5,319,210 A | 6/1994 | Moscovitch | |
| 5,498,876 A * | 3/1996 | Moscovitch | 250/474.1 |
| 5,969,359 A * | 10/1999 | Ruddy et al. | 250/370.05 |
| 6,140,651 A | 10/2000 | Justus et al. | |
| 6,811,607 B1 | 11/2004 | Akselrod | |
| 6,846,434 B1 | 1/2005 | Akselrod | |
| 2002/0117614 A1 * | 8/2002 | More et al. | 250/281 |
| 2004/0159803 A1 | 8/2004 | Akselrod et al. | |

OTHER PUBLICATIONS

Hunter, S.R. "Evaluation of a digital optical ionizing radiation particle track detector," Mar. 5, 1987, Nuclear Instruments and Methods in Physics Research, 469-477.*
Moscovitch et al., "Radiation Dosimetry Using Three-Dimensional Optical Random Access Memories," Nucl. Inst. Meth. Phys. Res. vol. 184 (2001), pp. 207-218.
Benton, et al, Proton Recoil Neutron Dosimeter for Personnel Monitoring, Health Phys., 40, pp. 801-809 (1981).
Piesch et al., "Albedo Dosimetry System for Routine Personnel Monitoring." Radiat. Prot. Dosim., 23 (1/4), pp. 117-120 (1988).
d'Errico, "Radiation Dosimetry and Spectrometry with Superheated Emulsions," Nuclear Inst. Meth. B, 184, pp. 229-254 (2001).

* cited by examiner

*Primary Examiner*—Renee Luebke
*Assistant Examiner*—Mary Zettl
(74) *Attorney, Agent, or Firm*—Jagtiani & Guttag

(57) ABSTRACT

The present invention provides a method and system for measuring the spatial distribution of fluorescence from the excited radiochromic luminescent material; and for signal processing of the spatial distribution of fluorescence to thereby detect tracks of one or more heavy charged particles with which the luminescent material has been irradiated. The present invention also provides a method and system for measuring the spatial distribution of fluorescence from an excited radiochromic luminescent material that has been irradiated with a hot particle of a radioactive material. The present invention provides a method for detecting thermal and fast neutrons as well as a method for determining parameters of heavy charge particles. In several embodiments of the present invention, the luminescent material comprises $Al_2O_3$ doped with magnesium and carbon.

121 Claims, 15 Drawing Sheets

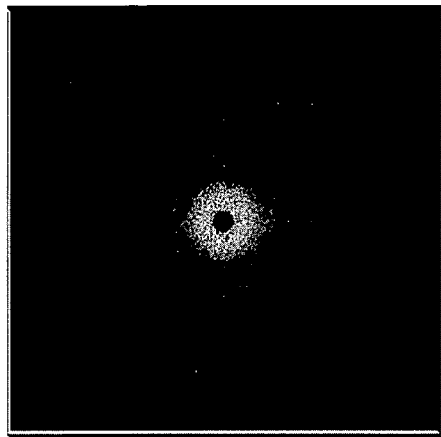
FIG. 9
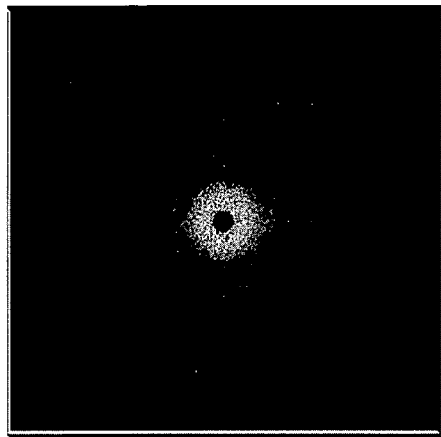
FIG. 8
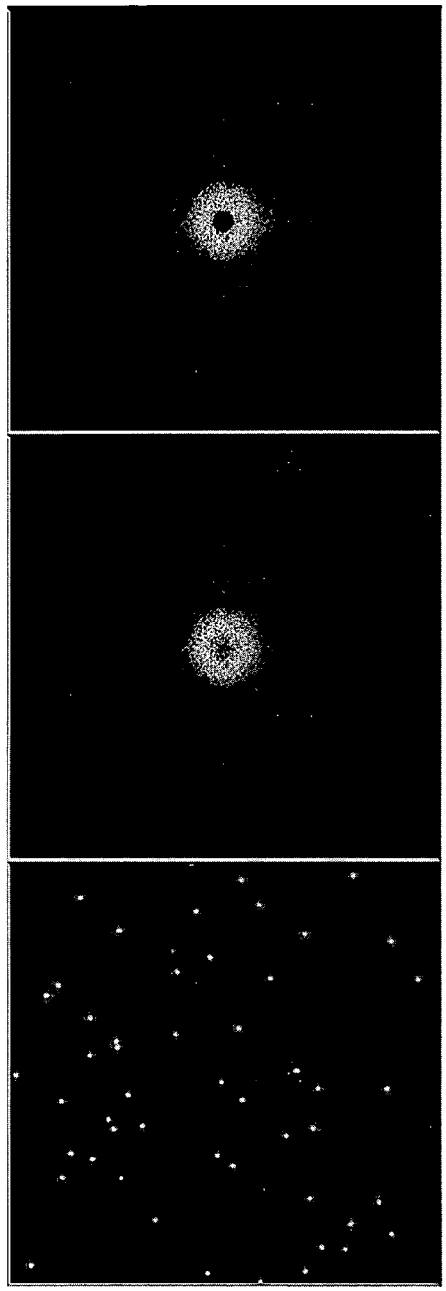
FIG. 7
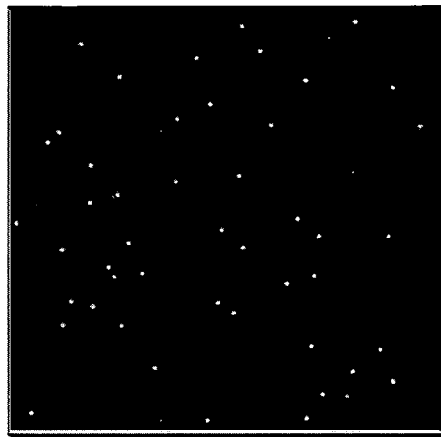
FIG. 12
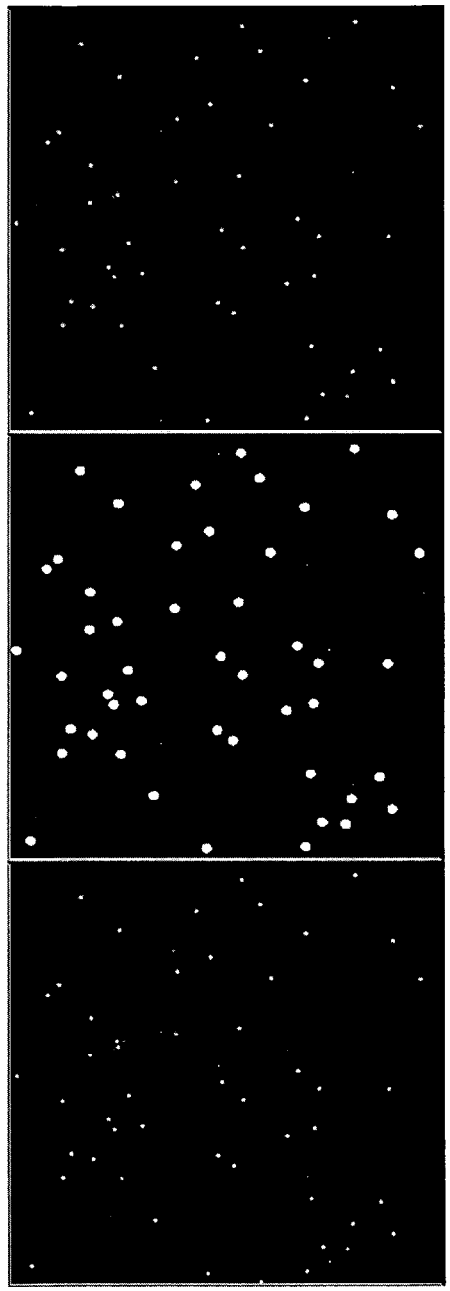
FIG. 11
FIG. 10

DETECTION OF NEUTRONS AND HEAVY CHARGED PARTICLES

CROSS-REFERENCE TO RELATED APPLICATIONS

This application claims priority from co-pending U.S. Provisional Patent Application No. 60/540,322, entitled "Method of Measuring Dose and Energy of Neutrons and Heavy Charged Particles," filed Feb. 2, 2004 and the entire disclosure and contents of this provisional patent application is hereby incorporated by reference.

BACKGROUND

1. Field of the Invention

This invention relates generally to radiation dosimetry techniques.

2. Related Art

The measurement of neutrons and heavy charged particles (HCP) remains one of the most challenging tasks in radiation dosimetry. Among the most widely investigated and used passive detector technologies are: plastic nuclear track detectors (PNTD) based on CR-39 plastic and its derivatives, pairs of $^6$LiF and $^7$LiF thermoluminescent detectors (TLD) in an albedo configuration and superheated bubble detectors (SBD). See Benton et al., "Proton Recoil Neutron Dosimeter for Personnel Monitoring. Health Phys., 40, pp. 801–809 (1981); Piesch et al., "Albedo Dosimetry System for Routine Personnel Monitoring," Radiat. Prot. Dosim., 23(1/4), pp. 117–120 (1988); d"Errico, "Radiation Dosimetry and Spectrometry with Superheated Emulsions," Nuclear Instr. Meth. B, 184, pp. 229–254 (2001). TLDs have the strong neutron energy dependence and the difficulty in discriminating between radiations having low- and high linear energy transfer (LET). PNTDs have good neutron/gamma discrimination but require laborious wet-chemistry processing and have low saturation fluence. SBDs are very sensitive to neutrons but bulky and environmentally unstable. All these difficulties have stimulated the search for a new approach.

The measurement of neutrons presents a special problem. Neutron radiation is not a directly ionizing type of radiation and requires transformation or conversion into ionizing radiation (e.g., electrons or heavy charged particles) that can be detected by detectors based on ionization of the detector medium. Detection of thermal neutrons requires nuclear reaction and conversion with isotopes such as $^6$Li or $^{10}$B having large thermal neutron capture cross-section. Fast neutron detection is most efficient using plastic converters containing high concentration of hydrogen. Having the same mass as a neutron, a proton can accept most of the kinetic energy of a neutron in head-on collision. The high energy recoil protons generated by these collisions are then able to cause ionization in the detector medium. The amplified signal from the active or passive detector is then processed and provides dosimetric or spectroscopic information about the radiation field.

Dosimeters and methods for detecting neutrons and heavy charged particles based on optically stimulated luminescence, thermoluminescence, and other luminescent and fluorescent techniques have been disclosed in the art. For example, an optically stimulated luminescent, fast neutron sensor and dosimeter is disclosed in U.S. Pat. No. 6,140,651 (Justus et al.), issued Oct. 31, 2000. The disclosed fast neutron sensor and dosimeter comprises a proton radiator with a doped glass, such as Nd-doped glass containing ZnS:Cu and can be read by either laser heating or infrared stimulation of the glass or by direct scintillation.

Thermoluminescent dosimeters and methods for reading thermoluminescent radiation are also disclosed in U.S. Pat. No. 4,638,163 (Braunlich et al.), issued Jan. 20, 1987; U.S. Pat. No. 4,825,084 (Braunlich et al.), issued Apr. 25, 1989; U.S. Pat. No. 4,839,518 (Braunlich et al.), issued Jun. 13, 1989; and U.S. Pat. No. 5,015,855 (Braunlich et al.), issued May 14, 1991. The disclosed dosimeters and methods measure ionizing radiation, particularly heavy charged particles emitted from radioactive materials and other heavy charged particle radiation sources by laser heating and thermoluminescence of phosphors, using, for example, a thin layer of thermoluminescent phosphor material and an inorganic binder heat bonded to a substrate, as described in U.S. Pat. No. 4,825,084 (Braunlich et al.).

A fluorescent glass dosimeter for reading a radiation dose is also disclosed in U.S. Pat. No. 5,057,693 (Burgkhardt et al.), issued Oct. 15, 1991. The disclosed dosimeter reads a radiation dose from a fluorescent glass element, where the radiation dose is determined from the intensity of the fluorescence emitted from the glass element's detecting face. A fluorescence diaphragm arrangement is provided so as to overlay the glass element detecting face and is movable thereon for changing the fluorescence detecting areas and a fluorescence intensity reading device is provided for determining fluorescence intensity distribution and the glass element detecting face.

A neutron dosimetry method, dosimeter and system are also disclosed in U.S. Pat. No. 5,319,210 (Moscovitch), issued Jun. 7, 1994 and U.S. Pat. No. 5,498,876 (Moscovitch), issued Mar. 12, 1996. The method, dosimeter and system disclosed stores information in a three dimensional fluorescent optical memory element that is altered by exposing the optical memory element to neutron radiation and dosimetric information is subsequently retrieved and analyzed by readout of the altered data with the laser system. One described optical memory element is a three dimensional optical random access memory (ORAM) comprising a volume of a transparent polymer doped with a light sensitive chemical such as spirobenzopyran, which is also described in Moscovitch et al., "Radiation Dosimetry Using Three-Dimensional Optical Random Access Memories," Nucl. Inst. Meth. Phys. Res. Vol. 184 (2001), pp. 207–18.

Unfortunately, the lower efficiency of detection and poorer discrimination between absorbed doses induced by heavy charged particles versus gamma radiation, remain as obstacles to the dosimetry of neutrons by prior dosimeters and methods. Prior dosimeters and methods can have limited spatial resolution, are sometimes not provided with imaging and/or spectroscopic capabilities or systems, may be able only to detect strongly penetrating photon and beta radiation, and may not be able to detect and image individual track of heavy charged particles. In particular, in integrating thermoluminescent and optically stimulated luminescent detectors, the small amounts of intense fluorescence produced within the particle track can be masked by the luminescence occurring from the significantly larger crystal volume as a result of photon and electron interactions. Thermoluminescent detectors and methods are also not able to detect every heavy charged particle incident and can have very low detection efficiencies. In addition, thermoluminescent methods are very slow, requiring tens of milliseconds per data point. Dosimeters and methods based on organic memory materials such a three-dimensional ORAM require pre-recorded optical data stored in the memory medium, require several spatially distributed bits to be affected by radiation and may not posses the sensitivity and spatial resolution required for imaging individual tracks of heavy charged particles.

SUMMARY

According to a first broad aspect of the present invention, there is provided a method comprising the steps of: (a) exposing an irradiated luminescent material to a light source to thereby form an excited luminescent material, the irradiated luminescent material compring a luminescent material that has been irradiated with one or more heavy charged particles; (b) measuring the spatial distribution of fluorescence from the excited luminescent material; and (c) signal processing the spatial distribution of fluorescence to thereby detect tracks of the one or more heavy charged particles, wherein the luminescent material is radiochromic.

According to a second broad aspect of the present invention, there is provided a method comprising the steps of: (a) irradiating one or more neutron converters with neutrons to thereby produce one or more heavy charged particles; (b) irradiating a luminescent material with the heavy charged particles to thereby form an irradiated luminescent material; (c) exposing the irradiated luminescent material to a light source to thereby form an excited luminescent material; (d) measuring the spatial distribution of fluorescence from the excited luminescent material; (e) signal processing the spatial distribution of fluorescence to thereby detect tracks of the one or more heavy charged particles; and (f) detecting the neutrons based on the tracks detected in step (e), wherein the luminescent material is radiochromic.

According to a third broad aspect of the present invention, there is provided a method comprising the steps of: (a) exposing an irradiated luminescent material to a light source to thereby form an excited luminescent material, the irradiated luminescent material comprising a luminescent material that has been irradiated with one or more heavy charged particles; and (b) measuring the spatial distribution of fluorescence at two or more depths below the surface of the excited luminescent material, wherein the luminescent material is a radiochromic inorganic material.

According to a fourth broad aspect of the present invention, there is provided a method comprising the steps of: (a) providing a spatial distribution of fluorescence from an excited luminescent material that has been irradiated with heavy charged particles and exposed to a light source; and (b) signal processing the spatial distribution of fluorescence to thereby detect tracks for the one or more heavy charged particles, wherein the excited luminescent material is radiochromic.

According to a fifth broad aspect of the present invention, there is provided a method comprising the steps of: (a) exposing an irradiated luminescent material to a light source to thereby form an excited luminescent material, the irradiated luminescent material comprising a luminescent material that has been irradiated with one or more hot particles of radiation; and (b) measuring the spatial distribution of fluorescence from the excited luminescent material, wherein the luminescent material is radiochromic.

According to a sixth broad aspect of the present invention, there is provided a method comprising the steps of: (a) irradiating a luminescent material with one or more heavy charged particles to thereby form the irradiated luminescent material; (b) exposing the irradiated luminescent material to a light source to thereby form an excited luminescent material; (c) measuring the spatial distribution of fluorescence from the excited luminescent material; and (d) signal processing of the spatial distribution of fluorescence produced by each one of the one or more heavy charged particles to obtain one or more parameters for each individual heavy charged particle, wherein the luminescent material is radiochromic and wherein the one or more heavy charged particles pass through an absorber of heavy charge particles prior to irradiating the luminescent material.

According to a seventh broad aspect of the present invention, there is provided a system comprising: an irradiated luminescent material that has been irradiated with one or more heavy charged particles; a light source for exposing the irradiated luminescent material to light to thereby form an excited luminescent material; means for measuring the spatial distribution of fluorescence from the excited luminescent material; and means for signal processing the spatial distribution of fluorescence to thereby detect tracks for the one or more heavy charged particles, wherein the irradiated luminescent material is radiochromic.

According to an eighth broad aspect of the present invention, there is provided a a luminescent material; one or more neutron converters; a light source for exposing the irradiated luminescent material to light to thereby form an excited luminescent material; means for measuring the spatial distribution of fluorescence from the excited luminescent material; and means for signal processing the spatial distribution of fluorescence to thereby detect tracks for the one or more heavy charged particles, wherein the luminescent material is radiochromic, and wherein when the one or more neutron converters are exposed to neutron radiation, the one or more neutron converters produce the one or more heavy charged particles that irradiate the luminescent material.

According to a ninth broad aspect of the present invention, there is provided a system comprising: an irradiated luminescent material that has been irradiated with one or more heavy charged particles; a light source for exposing the irradiated luminescent material to light to thereby form an excited luminescent material; and means for measuring the spatial distribution of fluorescence at two or more depths below the surface of the excited luminescent material, wherein the irradiated luminescent material is a radiochromic inorganic material.

According to a tenth broad aspect of the present invention, there is provided a system comprising: an irradiated luminescent material that has been irradiated with one or more hot particles of radiation; a light source for exposing the irradiated luminescent material to light to thereby form an excited luminescent material; and means for measuring the spatial distribution of fluorescence from the excited luminescent material.

According to an eleventh broad aspect of the present invention, there is provided a system comprising: a luminescent material; a radiation source for irradiating the luminescent material with heavy charged particles to thereby form an irradiated luminescent material; an absorber for absorbing at least a portion of the energy of the heavy charged particles, the absorber being disposed between the radiation source and the luminescent material; a light source for exposing the irradiated luminescent material to light to thereby form an excited luminescent material; means for measuring the spatial distribution of fluorescence from the excited luminescent material; and means for signal processing the spatial distribution of fluorescence to thereby detect tracks for the one or more heavy charged particles, wherein the luminescent material is radiochromic.

BRIEF DESCRIPTION OF THE DRAWINGS

The invention will be described in conjunction with the accompanying drawings, in which:

FIGS. 7–12 are micrographs illustrating a sequence of six image processing steps showing: (a) the original image (FIG. 7), (b) a power spectrum image after a Fast Fourier Transform (FFT) (FIG. 8), (c) a truncated image after FFT (FIG. 9), (d) an image after inverse FFT (FIG. 10), (e) a masked image with recognized objects (FIG. 11), and (f) a filtered and masked image ready for numerical processing of each track (FIG. 12);

DETAILED DESCRIPTION

Figure 1:
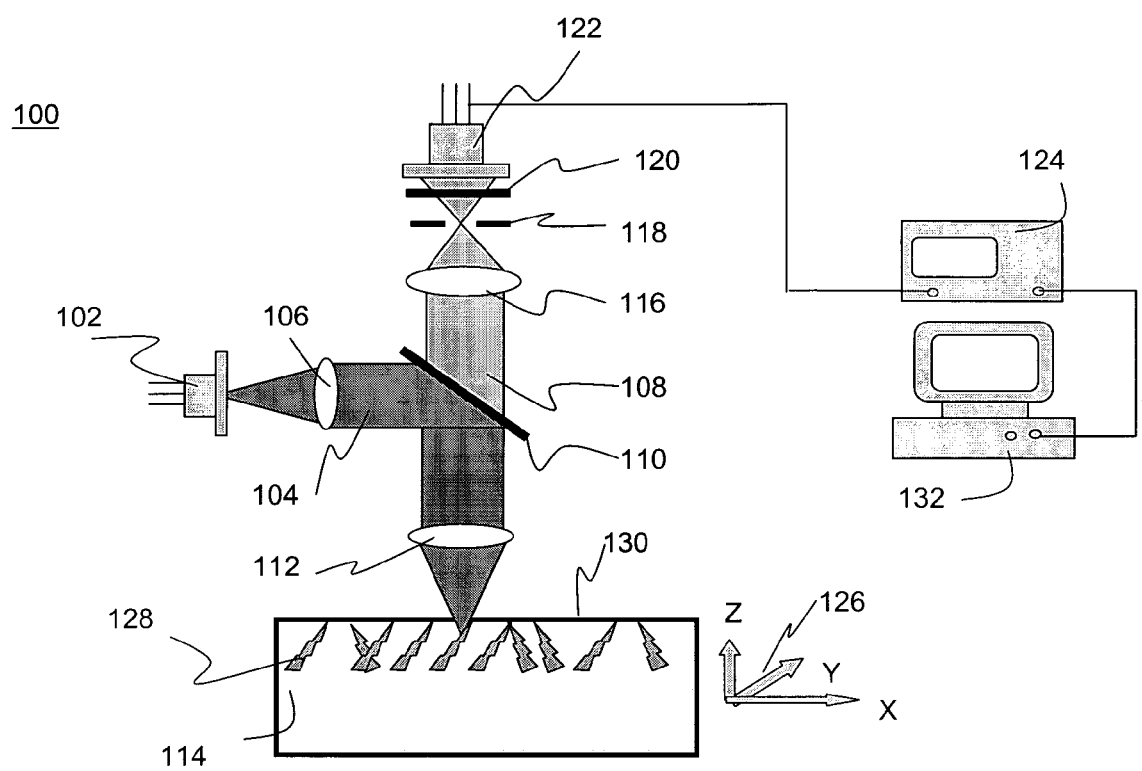
FIG. 1 is a schematic diagram of a readout apparatus for 3D confocal fluorescence imaging of tracks according to an embodiment of the present invention.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, a value or property is "based" on a particular value, property, the satisfaction of a condition, or other factor, if that value is derived by performing a mathematical calculation or logical decision using that value, property or other factor. For an example, a dosimetry detection device used with the method of the present invention may be calibrated based on the spatial distribution of fluorescence measured by the device when the device is used to measure the fluorescence of a luminescent material exposed to heavy charged particle of known type, energy and angle of incidence.

For the purposes of the present invention, the term "absorption band in the region of" or "emission band in the region of" refers to an absorption or emission band having a peak in the appropriate region. Sometimes the region may be a particular wavelength and sometimes the region may include a range of wavelengths indicating a possible shift in a band peak position, for example, as a result of a temperature change.

For the purposes of the present invention, the term "absorption characteristic" refers to how material used to make an absorber for heavy charged particles may affect the heavy charged particles that impact the absorber material.

One absorber material may absorb and/or let through different heavy charged particles than another absorber material. Also, some absorber materials may slow down particular heavy charged particles more effectively than other absorber materials. A given absorber may include two or more different absorber materials to take advantage of the different characteristics of different absorber materials.

For the purposes of the present invention, the term "angle of incidence" refers to the angle between the direction of the particle trajectory and the normal to the detector surface.

For the purposes of the present invention, the term "close proximity" refers to a distance comparable with the penetration range of heavy charge particles in a particular medium.

For the purposes of the present invention, the term "color center" refers to the conventional meaning of the term "color center", i.e. a point defect in a crystal lattice that gives rise to an optical absorption of a crystal and upon light excitation produces a photon of luminescence. A color center, an impurity or an intrinsic defect in a crystalline material creates an unstable species. An electron localized on this unstable species or defect performs quantum transition to an excited state by absorbing a photon of light and performs quantum transition back to a ground state by emitting a photon of luminescence.

For the purposes of the present invention, the term "confocal detection" refers generally to the descanned detection of fluorescent light where the light emitted from the focal plane (specimen) and from the planes located above and below the latter reaches a dichroic beam splitter or mirror. This dichroic beam splitter/mirror separates the fluorescent light from the excitation light, with the fluorescent light being subsequently focused on a diaphragm (confocal diaphragm/pinhole) located precisely in a plane conjugate to the focal plane. The optical resolution of the microscope can be adjusted by varying the size of the diaphragm. Another dichroic blocking filter which again suppresses the excitation radiation is located in front or behind the diaphragm. After passing the blocking filter, the fluorescent light is measured by a photodetector. A typical confocal detection scheme involves the arrangement of a scanning confocal microscope in which a small aperture is installed in front of a photodetector in the position of the secondary focus of the imaging system and where the laser beam reflected from the medium or the laser induced fluorescence light from the medium is collected by the objective lens and is imaged on the aperture using a dichroic beam splitter or mirror.

For the purposes of the present invention, the term "converter" refers to material, typically a layer thereof, installed in front of the detector and able to convert one or more types of radiation (e.g., neutron radiation, etc.) into other types of radiation, e.g., recoil protons, alpha particles or gamma rays.

For the purposes of the present invention, the term "neutron converter" refers to a converter that is able to convert neutrons into other types of radiation.

For the purposes of the present invention, the term "crystalline material" refers to the conventional meaning of the term "crystalline material", i.e., any material that has orderly or periodic arrangement of atoms in its structure.

For the purposes of the present invention, the term "defect" refers to the conventional meaning of the term "defect" with respect to the lattice of a crystal, i.e. a vacancy, interstitial, impurity atom or any other imperfection in a lattice of a crystal.

For the purposes of the present invention, the term "detectable dose" refers to the dose, amount, level, etc. of heavy charged particles, neutrons, gamma radiation, etc., that is detectable, measurable, etc., above the background noise level.

For the purposes of the present invention, the term "detection efficiency" refers to the ratio of number of particles of radiation incident on the detector to the number particles detected or registered.

For the purposes of the present invention, the term "directly ionizing radiation" refers to energetic charge particles such as: fast electrons/beta particles, helium ions/alpha particles, hydrogen ions/protons, heavy ions, etc.

For the purposes of the present invention, the term "dosimetric information" refers to the number of color centers present in a luminescent material that allows for determination of a radiation dose to which the luminescent material has been exposed to be determined according to the methods of the present invention. For example, the number of Type I and Type II color centers present in a luminescent material is dosimetric information, because a decrease in the number of Type I color centers or an increase in the number of Type II color centers can be used to determine the dose of ionizing radiation to which a luminescent material of the present invention has been exposed.

For the purposes of the present invention, the term "fluorescence" refers to the conventional meaning of the term "fluorescence", i.e., a type of luminescence in which an atom, molecule, etc., emits visible radiation during quantum transition from a higher to a lower electronic state and where the time interval between absorption and emission of energy is typically extremely short (e.g., $10^{-9}$ to $10^{-3}$ seconds).

For the purposes of the present invention, the term "fluorescent color centers" refers to color centers that are able to fluoresce under light stimulation For the purposes of the present invention, the term "F-type center" refers to any one of the following centers: F-center, $F^+$-center, $F_2^+$-center, $F_2^{2+}$-center, $F_{2+}(2Mg)$-center, $F_2^{2+}(2Mg)$-center, etc.

For the purposes of the present invention, the term "heavy charged particle (HCP)" refers to nuclei or ions that originate, for example, from radioactive nuclear decay, from space, from an accelerator, etc. Some representative, but nonlimiting examples of heavy charged particles include: alpha particles, tritium ions, protons, recoil protons, etc.

For the purposes of the present invention, the term "high gradient radiation field" refers to a radiation field having significant spatial variations in dose rate or fluence of charge particles.

For the purposes of the present invention, the term "highly penetrating radiation" refers to radiation having penetration range comparable with or greater than the thickness of the detector or the absorber. Examples of highly penetrating radiation are gamma and X-ray photons, neutrons, high energy beta particles, etc.

For the purposes of the present invention, the term "low penetrating radiation" refers to radiation from heavy charged particles having penetration range significantly smaller than the thickness of the detector or the absorber. Examples of low penetrating radiation are: alpha particles, recoil protons, etc.

For the purposes of the present invention, the term "penetrating photon radiation" refers to short wavelength electromagnetic radiation originated from radioactive nuclear decay, from space or produced by accelerating or decelerating of charge particles, for example, in X-ray machine or in an accelerator.

For the purposes of the present invention, the term "penetrating beta radiation" refers to high energy electrons originated from radioactive nuclear decay, from space, produced by radiation-induced ionization of atoms or by acceleration in electric field.

For the purposes of the present invention, the term "high spatial resolution imaging" refers to imaging able to resolve small objects comparable in size with the wavelength of the excitation light.

For the purposes of the present invention, the term "hot particle" refers to a discrete particle of radioactive material with dimensions of less than or about 1 mm and producing spatially non-uniform exposure.

For the purposes of the present invention, the term "imaged field" refers to experimentally acquired single image.

For the purposes of the present invention, the term "indirectly ionizing radiation" refers to X-rays, gamma photons, or neutrons.

For the purposes of the present invention, the term "ionizing radiation" refers to any particulate or electromagnetic radiation that is capable of dissociating atoms into ions and electrons. The present invention may be used to determine doses of both directly ionizing radiation and indirectly ionizing radiation.

For the purposes of the present invention, the term "irradiation" refers to the conventional meaning of the term "irradiation", i.e., exposure to high energy charge particles, e.g., electrons, protons, alpha particles, etc., or electromagnetic radiation of wave-lengths shorter than those of visible light, e.g., gamma rays, x-ray, ultraviolet, etc.

For the purposes of the present invention, the term "linear energy transfer" (LET) refers to the average energy imparted to a medium by radiation of a specified energy upon penetrating a short specified distance.

For the purposes of the present invention, the term "luminescence" refers to the conventional meaning of the term "luminescence", i.e., the visible or invisible electromagnetic radiation produced by solids, liquids and gases (emitters) and that is not accompanied by high temperature of the emitter, but is the result of the absorption of excitation energy in the form of photons, charged particles, chemical interactions, etc.

For the purposes of the present invention, the term "luminescent material" refers to any material, composition, compound, etc., that exhibits luminescence.

For the purposes of the present invention, the term "maximum penetration range" or "penetration range" refers to the distance in the medium at which a heavy charged particle stops to rest.

For the purposes of the present invention, the term "non-ionizing radiation" refers to any radiation that is not ionizing radiation.

For the purposes of the present invention, the term "optically stimulated luminescence (OSL)" refers to luminescence generated by optical stimulation (illumination) of irradiated material. Wavelength of luminescence is usually different from the wavelength of stimulation light.

For the purposes of the present invention, the term "oxygen vacancy defect" refers to a defect caused by an oxygen vacancy in a lattice of a crystalline material. An oxygen vacancy defect may be a single oxygen vacancy defect, a double oxygen defect, a triple oxygen vacancy defect, or more than triple oxygen vacancy defect. An oxygen vacancy defect may be associated with one or more impurity atoms or may be associated with an interstitial intrinsic defect such as misplaced interstitial oxygen atoms. Occupancy of an oxygen vacancy by two electrons gives rise to a neutral F-center, whereas occupancy of any oxygen vacancy by one electron forms an $F^+$-center. An $F^+$-center has a positive charge, with respect to the lattice. A cluster of oxygen vacancy defects formed by double oxygen vacancies is referred to as an $F_2$-type center. A cluster of oxygen vacancy defects formed by two $F^+$-centers and charge-compensated by two Mg-impurity atoms is referred to as a $F_2^{2+}(2Mg)$-center.

For the purposes of the present invention, the term "parameter of a heavy charged particle" refers to any parameters that describe any property of the heavy charged particle. Examples of parameters include: angle of incidence, maximum penetration range, energy, charge, atomic number, linear energy transfer, etc.

For the purposes of the present invention, the term "passive detection" refers to the detection technique that does not require any active electronic circuitry and a supply of electrical power.

For the purposes of the present invention, the term "radiation dosimetry" refers to the conventional meaning of the term "radiation dosimetry", i.e., the measurement of the amount of radiation delivered to the material, the object or the body of an individual.

For the purposes of the present invention, the term "radiochromic material" refers to a material that changes coloration, optical absorption or fluorescence properties when exposed to radiation. Color centers and fluorescent color centers may exist before the exposure to radiation or may be activated when the material is exposed to radiation.

For the purposes of the present invention, the term "recoil protons" refers to those protons that are generated by the collision of neutrons with a converter containing a source of hydrogen atoms, e.g. polyethylene.

For the purposes of the present invention, the term "spatially correlated image" refers to one or more images of the same tracks obtained at the same lateral coordinates but at the different depths inside the detector medium.

For the purposes of the present invention, the term "thermal neutron capture cross-section" refers to the parameter characterizing the efficiency of the atomic nuclei to absorb thermal neutrons and undergo nuclear reaction that may result in emission of gamma photons, electrons, heavy charge particles etc.

For the purposes of the present invention, the term "thermoluminescence (TL)" refers to the conventional meaning of the term "TL", i.e., luminescence that occurs from irradiated solids under thermal stimulation (e.g. during heating).

For the purposes of the present invention, the term "track" refers to latent or visible image of a particle trajectory penetrating the medium.

For the purposes of the present invention, the term "trap" refers to an electron trap or a hole trap. A trap is a structural defect in a crystal lattice able to create a localized electronic state and capable of capturing free electron or a hole from a conduction or a valence band of the crystalline material.

Description

In various embodiments, the present invention provides dosimetric detectors, luminescent materials and methods that provide one or more of the following features: (1) detection of single heavy charged particles; (2) detection of neutron radiation; (3) fast and essentially nondestructive imaging of tracks produced by single high energy heavy charged particles; (4) detection and high spatial resolution imaging of the radiation field, for example, that produced by hot particles of radioactive material; (5) spectroscopy of heavy charged particles; (6) measuring the parameters of heavy charged particles, including energy, charge, angle of incidence, and penetration range; (7) discrimination between dose from low-LET and high-LET radiation; (8) three-dimensional imaging of a radiation field; and (9) erasing stored information and images from the detector.

In one embodiment, the present invention provides for detection of single heavy charged particles utilizing luminescent material that comprises doped metal oxide crystals containing at least one oxygen vacancy defect. The storage of dosimetric information according to the present invention is based on ionization of the crystal matrix, generation of free electrons and holes followed by the capture of electrons and holes by traps and color centers. Detection and imaging of tracks created by individual heavy charged particles inside the luminescent crystal and measuring the absorbed dose of neutron and heavy charged particles may be performed by various detection and imaging techniques, including scanning laser beam techniques and confocal fluorescent detection techniques.

In addition to metal oxides, in some embodiments of the present invention, the luminescent material of the present invention may be various inorganic materials (oxides, sulfides, halides, other compounds and salts), or organic materials having color centers and able to produce fluorescence under optical stimulation. For example, Parthenopoulos et al. describe organic luminescent materials that may be used in some embodiments of the present invention in D. A. Parthenopoulos and P. M. Rentzepis, *Three-Dimensional Optical Storage Memory*, Science, Vol. 245, pp. 843–845, August 1989, the entire contents and disclosure of which is hereby incorporated by reference. U.S. Pat. No. 5,319,210 (Moscovitch), issued Jun. 7, 1994 and U.S. Pat. No. 5,498,876 (Moscovitch), issued Mar. 12, 1996 also describes organic luminescent materials that may be used in some embodiments of the present invention, and these patents are hereby incorporated by reference.

In one embodiment, the present invention also provides for detection of neutrons. Detection of neutron radiation may be achieved according to the present invention by positioning this luminescent material in close proximity to a converter of neutron irradiation, with the converter transforming or converting the non-ionizing neutron radiation into ionizing radiation, e.g., heavy charged particles, such as alpha particles, tritium ions, recoil protons, etc., that then irradiate the luminescent material.

In one embodiment, the present invention provides a method of discriminating between low and high penetration radiation, for example discriminating between dose of gamma and neutron radiation. The present invention also provides a method for spectroscopic analysis and measurement of heavy charged particles to determine the various parameters of such particles, including energy, atomic number, linear energy transfer, penetration range, etc. The present invention further provides for high spatial resolution three-dimensional imaging of the radiation field generated by irradiation of a luminescent material with heavy charged particles.

In one embodiment, the present invention is also directed at space radiation dosimetry and spectroscopy of high energy heavy ions which are common in the space environment. In another embodiment, the present invention is also directed at radiobiological and medical application of heavy high energy ions for radiotherapy. In another embodiment, the present invention is further directed at other applications that require high spatial resolution imaging of high gradient radiation fields, for example, the radiation field created by small hot particles of radioactive materials.

In one embodiment, the present invention utilizes a luminescent material comprising doped metal oxide crystals containing at least one type of aggregate oxygen vacancy defect for measuring an absorbed dose of photons and charged particles. Storage of dosimetric information is based on ionization of the crystal matrix, generation of free electrons and the capture of the electrons and holes by traps and color centers. In one embodiment of the present invention, luminescent materials comprising doped metal oxide crystals containing oxygen vacancy defects may be used. In one embodiment of the present invention, the metal oxide crystals used may be single crystals of aluminum oxide doped with carbon and magnesium ($Al_2O_3$:C,Mg) such as described in U.S. Patent Application No. 2003-0218151 to Akselrod, filed Dec. 4, 2002 and in U.S. Pat. No. 6,811,607 to Akselrod, filed Dec. 4, 2002, the entire contents and disclosures of which are hereby incorporated by reference In one embodiment of the present invention, the crystalline metal oxide used may be $Al_2O_3$:C,Mg single crystals that are characterized by several optical absorption (OA) bands with a blue absorption band responsible for the visible green coloration of the crystal. These crystals have a high concentration of single and double oxygen vacancies in the form of neutral F-centers as well as $F^+$ and $F_2^{2+}$ centers, charge-compensated by the nearby Mg-impurity atoms. The aggregate defect composed of two oxygen vacancies and two Mg-impurity atoms with two localized electrons are denoted herein as $F_2^{2+}$(2Mg) and is responsible for a blue absorption-excitation band at 435 nm that produces a green fluorescence centered at 520 nm, and has a short fluorescent lifetime of 9±3 ns. Another color center, believed to be a tri-electron $F_2^+$(2Mg)-center, is obtained as a result of radiation induced conversion when an electron is captured by another $F_2^{2+}$(2Mg)-center. The $F_2^+$(2Mg)-center has at least two absorption/excitation bands 335 and 620 nm and has a fluorescent emission at 750 nm with 75±5 ns lifetime.

The nonirradiated $Al_2O_3$ crystals contain a high concentration of Type I color centers responsible for the blue absorption band at 435 nm and emission at 520 nm (presumably $F_2^{2+}$(2Mg)-centers) and a low concentration of Type II color centers responsible for 335 and 620 nm absorption band and 750 nm emission band (presumably $F_2^+$(2Mg)-centers). After exposure to an ionizing radiation, the concentration of Type I color centers is reduced and the concentration of Type II color centers is increased. The absorbed dose is determined by the intensity of fluorescence of either Type I centers (520 nm) or Type II color centers (750 nm). The typical way to perform measurements is to illuminate the $Al_2O_3$:C,Mg crystal with red laser (for example He—Ne 633 nm laser or laser diodes with wavelength at 635 or 650 nm) and to measure the intensity of 750 nm fluorescence.

The luminescent materials comprising $Al_2O_3$:C,Mg crystals that can be utilized in various embodiments of the present invention contain high concentration of traps and color centers able to capture free electron and holes generated during irradiation and is able to produce fluorescence under optical excitation. The intensity of the fluorescence generated is generally proportional to the absorbed dose. To obtain dosimetric information, the detection of this fluorescence can be performed with a confocal detection scheme that allows for high spatial resolution of fluorescence. Principles of confocal fluorescent microscopy are well known (see, for example, *Confocal and two-photon microscopy: Foundations, applications, and advances*, Edited by A. Diaspro, Wiley-Liss New-York, pp 19–38, 2002, the entire contents and disclosure of which is hereby incorporated by reference). A confocal detection scheme allows one to detect fluorescence only from a spatially localized focal spot of the excitation of laser light.

To discriminate between a fluorescent signal produced by heavy charged particles and a signal produced by gamma radiation, 3D spatial distribution of fluorescent intensity from a luminescent crystal can be obtained by scanning of a sample or a laser beam and using a fluorescent confocal detection technique. The depth distribution and intensity of the measured fluorescent signal can be used to calculate the dose and energy distribution of the neutrons or heavy charged particles that the luminescent material is irradiated with. The fluorescent intensity at the depth from the crystal surface greater than the maximum range of the heavy charged particles can then be used to determine the dose of photon radiation.

Because neutrons are non-ionizing radiation, passive integrating radiation detectors, such as these doped $Al_2O_3$ crystals that rely on ionization effects, are not very sensitive to neutrons. Accordingly, the neutrons need to be converted to directly ionizing radiation, such as alpha particles, energetic protons, etc., to be detected by such crystals. In case of thermal neutrons, conversion of neutrons into alpha particles is achieved by nuclear reaction with radioactive elements, such as $^6Li$ and $^{10}B$, having a large thermal nuclear capture cross-section. For dosimetry of fast neutrons, recoil protons from hydrogen rich plastics, like polyethylene, are generated. These converters of neutrons may be associated with, attached to or otherwise in contact with the luminescent material, can be mixed or merged with the luminescent material or can be even be part of or incorporated into the luminescent material. Heavy charged particles of cosmic rays usually do not need any conversion but detector sensitivity to such cosmic rays strongly depends on their respective atomic number and energy.

The present invention is further illustrated by reference to the drawings. Referring to FIG. 1, a schematic diagram of an apparatus 100 for carrying out the method of present invention is illustrated. A fiber-optically coupled laser diode 102 (e.g., from BlueSky Research) producing 5 mW at 639 nm laser light 104 and collimated by lens 106 is used for stimulating the 750 nm fluorescence 108. A long-wavelength-pass dichroic mirror 110 (LWP-750), is used to reflect the excitation laser light 104 and transmit the fluorescence 108. An objective lens 112 (e.g., Nikon CFI-60 PlanFluor, 60X, 0.85 NA) with adjustable spherical aberration compensation (SAC), having a range of 110 to 230 μm in glass forms the diffraction-limited laser spot at different depths in the luminescent single crystal 114. The same objective lens 112 is used both for laser light illumination and fluorescent light collection. Fluorescent light 108 collected by objective lens 112 and transmitted by dichroic mirror 110 is focused by the lens 116 on a confocal 50 μm aperture 118. An additional cut-off filter 120 (e.g., RG-695 color glass) is installed after the confocal aperture 118 in front of the photodetector 122. A cut-off glass filter 120 is needed to reject residual stimulating laser light reflected by the crystal sample 114 and transmitted by the dichroic mirror 110. As a photodetector 122 an avalanche photodiode (APD) (e.g., a Hamamatsu 5460-01) connected to a transimpedance amplifier (not shown) is used. The photodetector 122 and the amplifier provide a photoelectric sensitivity of $-1.5 \cdot 10^8$ V/W. An oscilloscope 124 (e.g., Tektronix TDS-5104) is used to digitize the signal from photodetector 122. Laser-induced fluorescence is detected using an infinite conjugate confocal geometry. The confocal detection scheme allows for high spatial and depth resolution under the condition of one-photon absorption, even when areas of the crystal adjacent to the focal spot of the stimulation light also produce fluorescence.

During measurements, a luminescent material comprising a doped metal oxide crystal such as $Al_2O_3$:C,Mg single crystal 114 is attached to a 3D stepper-piezo translation stage 126 (e.g., from Polytek PI having 10 nm resolution). Selection of the focal depth within the 3D volume of the crystal and correction of spherical aberrations is performed by moving the crystal in the Z-direction and by adjusting the SAC settings of the objective lens 112. Preliminary positioning of the sample is done using stepper actuated stages 126. High resolution scanning of the sample in lateral (XY) and axial (XZ) directions is performed within a 100 μm range using the 3D piezo actuators at a velocity of 0.5 mm/s. Images with a field of view of up to 100 by 100 μm are produced by 1000 scans with an increment of 100 nm. The stimulation laser beam is focused at different depths below the crystal surface and sequential layer-by-layer imaging is then made. Data from each layer is combined to construct a 2D or 3D image of single tracks 128. The position of the crystal surface is determined by finding the peak reflection of the laser beam from the crystal surface 130.

Control of all system components, and data and image processing is performed by computer 132 and software (e.g., written in the National Instruments LabView™ programming environment). Image processing that includes Fast Fourier Transforms (FFT), high and low spatial frequency truncation, inverse FFT, masking, and track size and brightness analysis is applied for each acquired field.

The typical method of readout of dosimetric information is performed via a confocal fluorescent microscopy detection scheme and allows for high 3D spatial resolution. The confocal detection scheme allows one to perform spatial discrimination and detection of fluorescence only from a highly localized volume of the crystal at the focal spot of the excitation laser light. The high ionization density within the tracks allows for discrimination of the confounding luminescence induced by photon and beta radiations that have very small LET values.

Figure 2:
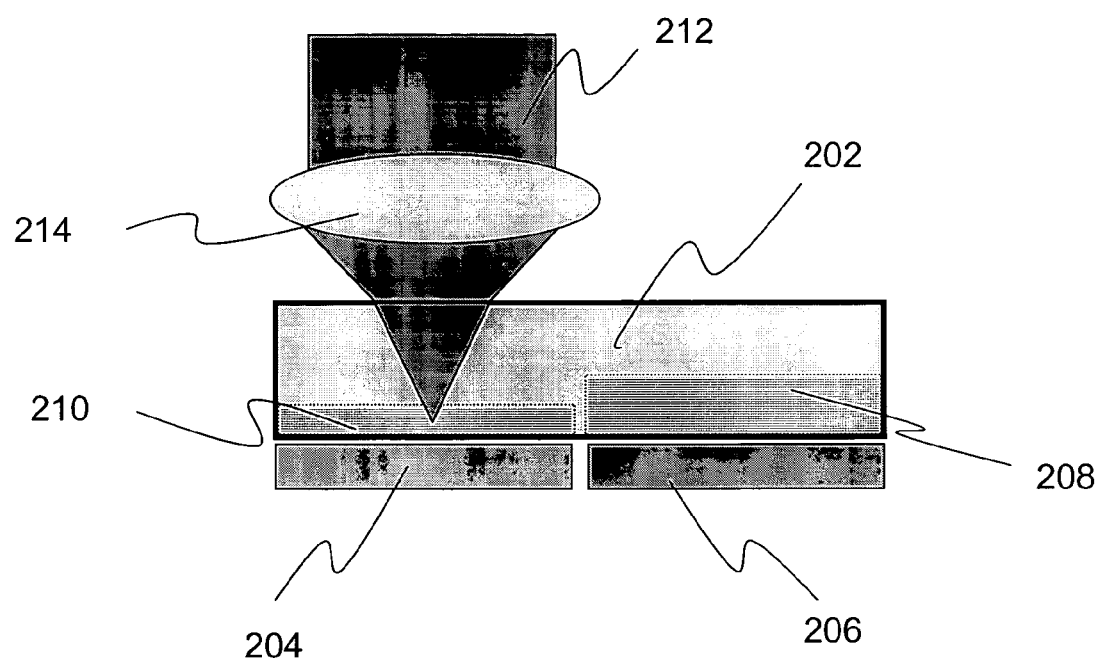
FIG. 2 is a schematic diagram of a detector and a readout configuration for measuring neutron-induced tracks according to an embodiment of the present invention.

In another embodiment of the present invention illustrated by FIG. 2, the luminescent material comprising a doped metal oxide crystal such as $Al_2O_3$:C,Mg crystal 202 is put in contact a with converters 204 and 206 during irradiation with thermal and fast neutrons. For example, for detection of thermal neutrons, the converter 204 is comprised of a material enriched with isotopes of $^6Li$ or $^{10}B$ having a high capture cross-section for thermal neutrons. Alternatively, for the detection of fast neutrons, converter 206 may contain high concentration of hydrogen for efficient production of recoil protons. The fluorescent imaging of tracks 208 and 210 is performed either from the side of the luminescent material contacting converter 204 (after removing or detaching the converter), or from the opposite side by focusing and scanning the laser beam 212 using objective lens 214 on the layer inside of the crystal close to the converter 204. In the latter case, there is no need to detach crystal 202 from converter 204.

Figure 3:
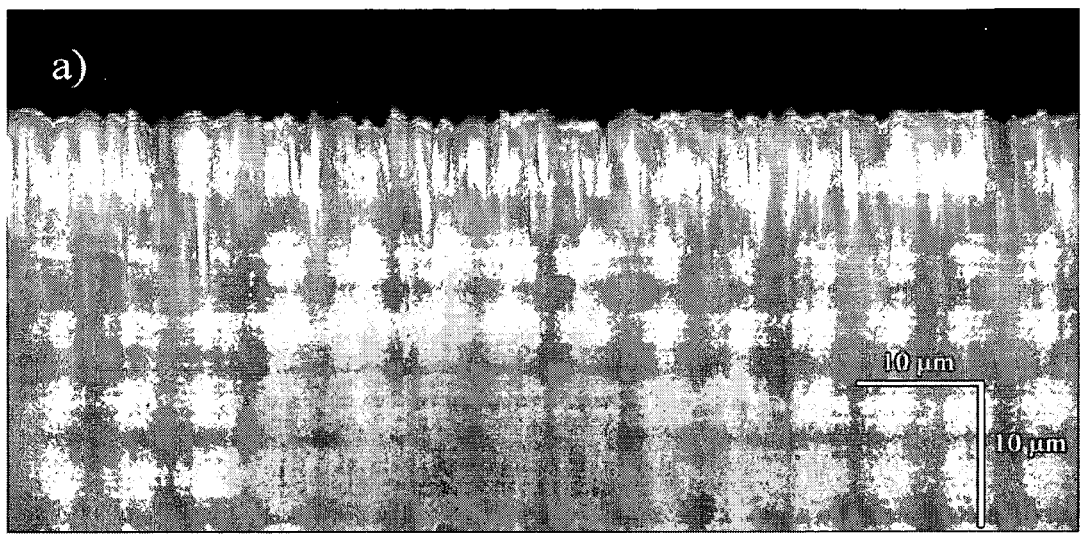
FIG. 3 is a confocal fluorescent image of a crystal (surface of crystal at the upper part of image) irradiated with alpha particles obtained during XZ-scan according to an embodiment of the present invention.
Figure 4:
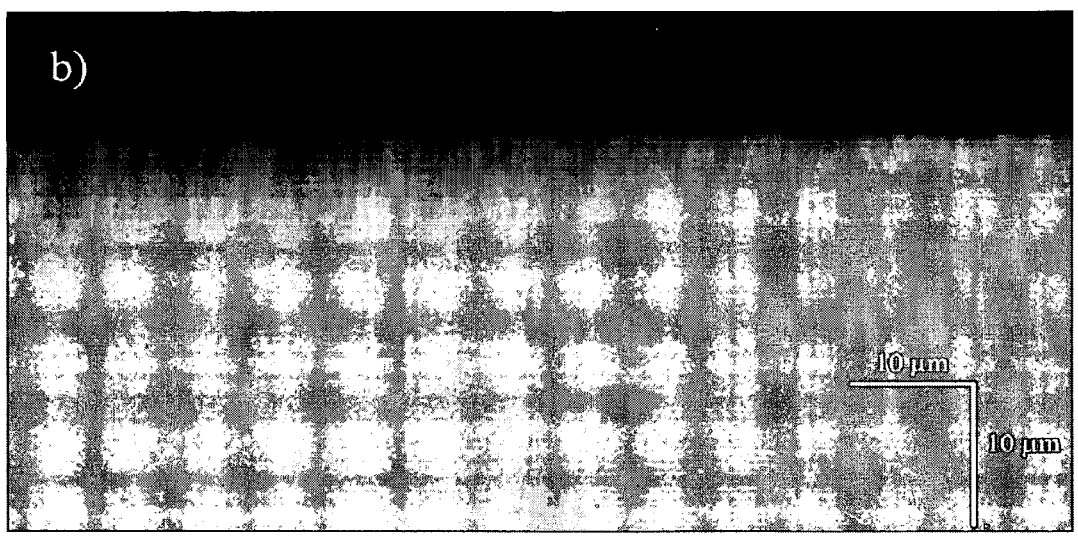
FIG. 4 another confocal fluorescent image of the crystal of FIG. 3 behind a mask obtained during XZ-scan according to an embodiment of the present invention.

In another preferred embodiment of the present invention the luminescent crystal is irradiated in the mixed radiation field comprising both low and high penetrating radiation, for example alpha particles and gamma rays. To discriminate the absorbed dose from low penetrating radiation the fluorescent image is obtained at the depth inside the crystal within the range of low penetrating radiation, whereas the absorbed dose of highly penetrating radiation is determined by measuring fluorescent intensity at a depth larger than the penetration range of low penetrating radiation. As an example of this approach, a depth-dose profile of fluorescence obtained before and after $^{241}$Am alpha- and accompanying 60 keV gamma-radiations, is illustrated by FIGS. 3 and 4.

Figure 5:
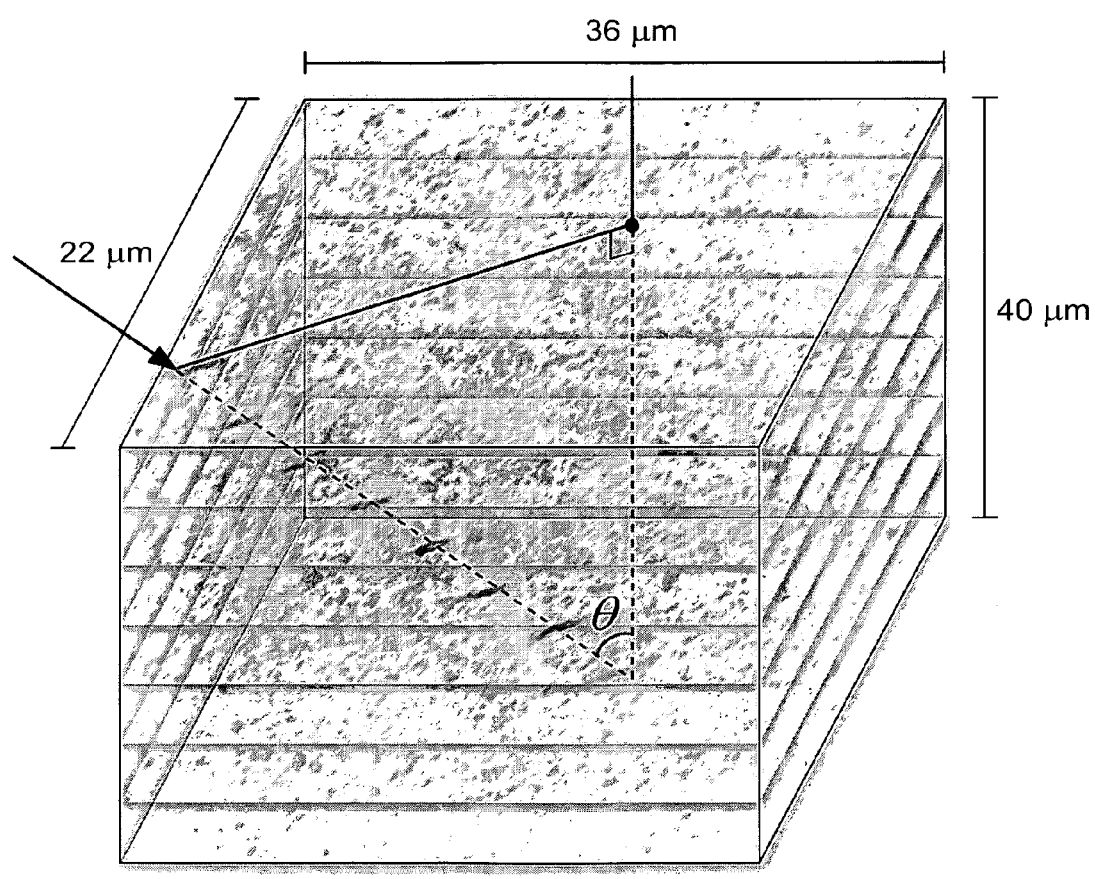
FIG. 5 is a composite image of a three-dimensional (3D) reconstruction of a single track from a recoil proton entering a crystal at an angle θ to the normal, where the composite image is composed of eight fluorescent images obtained by laser scanning at different depths in 5 μm increments, and where the fluorescent images are shown in negative contrast and semitransparent for better presentation.

In yet another embodiment of the present invention the luminescent material and confocal fluorescent detection technique are used to provide information about the spectroscopic parameters (e.g., energy, atomic number, angle of incidence, penetration range, etc.) of high-LET radiation. The intensity of fluorescence is function of LET and atomic number of the high energy ions. To provide high energy resolution spectroscopy, several fluorescent images are acquired at the same lateral position but at a different depth bellow the crystal surface and processed in correlation with each other to provide information on the angle of incidence and the penetration range, as illustrated by FIG. 5.

Figure 6:
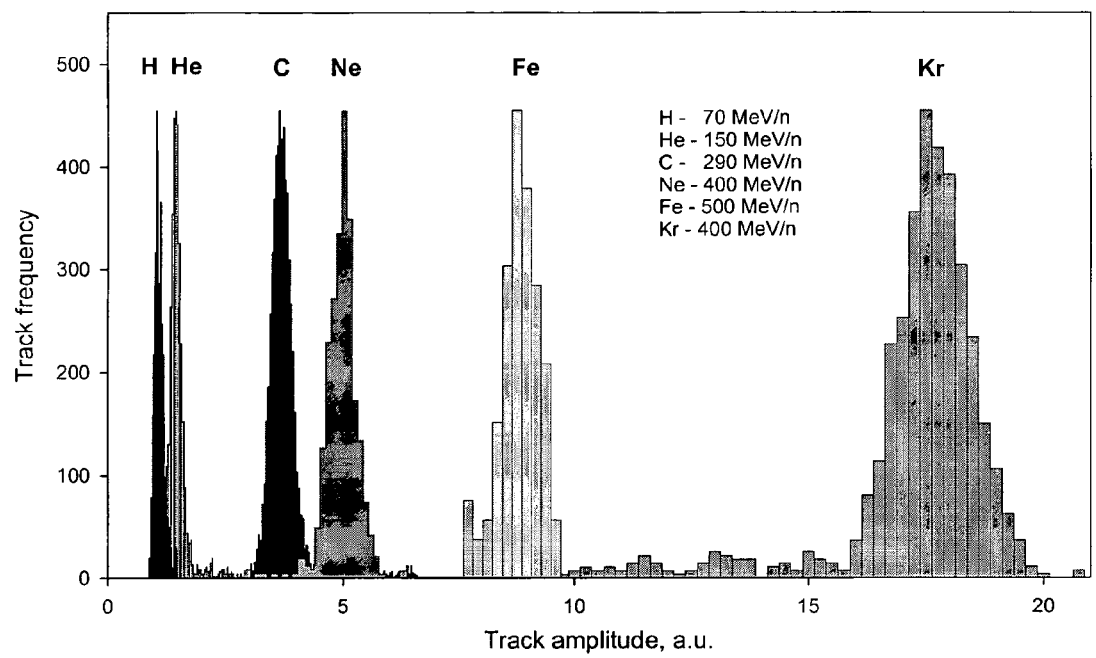
FIG. 6 shows a graphical distribution of fluorescent peak amplitudes for six high energy heavy ions and illustrates the spectroscopic capabilities of the method of the present invention.

According to yet another embodiment of the present invention, the intensity of the fluorescent tracks is used to provide information about the energy and charge of the incident ions. FIG. 6 shows the distributions of the fluorescent amplitude for tracks produced by six different high energy ions comprising H, He, C, Ne, Fe, and Kr and having energy from 65 to 400 MeV/n. From the graphical plots such as that illustrated in FIG. 6, the method of the present invention can be used as a spectroscopy technique to identify different ions and their energies.

In an analysis of the fluorescent images, each ion track is identified, extracted from the image and individually processed. Information such as maximum amplitude, integral intensity, cross-section area, and position can then be determined. The first step is to remove the signal and any background variations due to the background fluorescence from the "as-grown" crystal. Referring to the images of FIGS. 7–12, this is accomplished by converting the original fluorescent image (see FIG. 7) to the frequency domain in the optical representation by using a Fast Fourier Transform (FFT). The resulting power spectrum image is shown in FIG. 8. The low frequencies in the center of the power spectrum image, representing background variations, and the high frequencies on the peripheries of the image, representing detector and media noise, are filtered by low and high frequency truncation to provide the image shown in FIG. 9. An inverse FFT is then performed on the truncated image of FIG. 9 to obtain the filtered image, shown FIG. 10.

The second step in image processing is to automatically identify the tracks in the filtered image. This is done using a pattern-recognition and matching algorithm for the gray-scale images. A template image of a typical track propagating perpendicular to the crystal surface is "learned" by the computer algorithm, and the filtered image is then searched for that template. Matching objects that are above a certain "match score" and minimum contrast are analyzed and their positions are recorded. By knowing the positions, the desired properties of each track are obtained and further statistical analysis is done. As an illustration, the final processed image of FIG. 12 is obtained by masking the filtered image of FIG. 10 with the masks of FIG. 11 having the shape of the template image and coordinates of each identified track. The previously described image processing procedure leaves only the image of each track, without the surrounding background.

Figure 13:
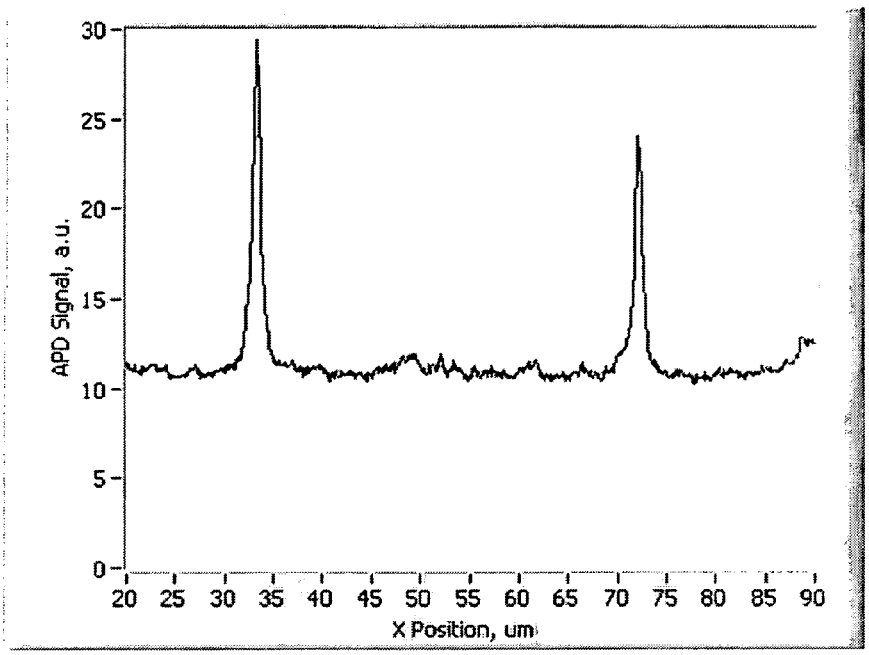
FIG. 13 is a graphical plot of a cross-section of a sample image before FFT filtering.
Figure 14:
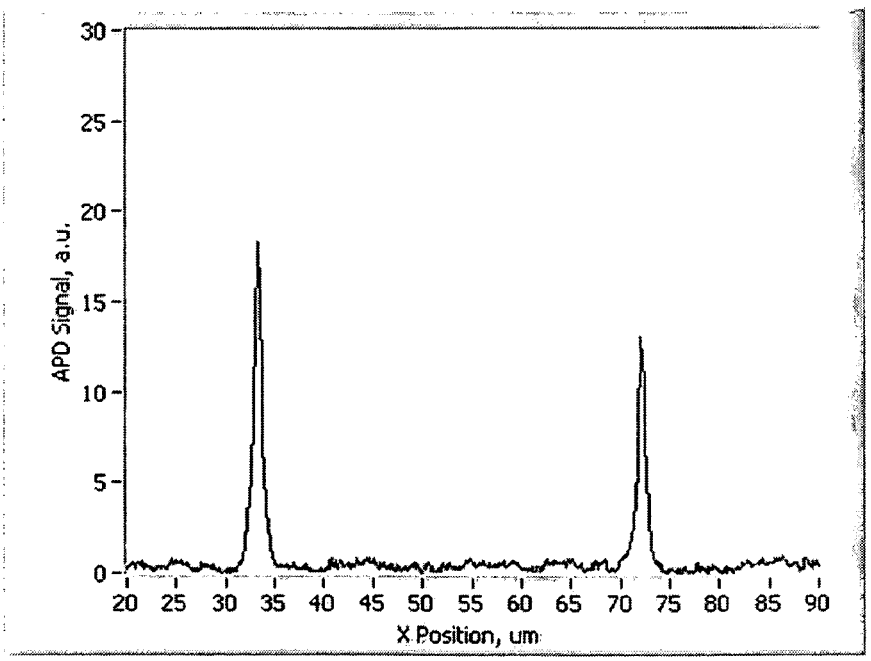
FIG. 14 is a graphical plot of a cross-section of a sample image after performing FFT filtering and frequency truncation.

Cross-sections of a sample image before and after FFT filtering are shown, respectively, in FIGS. 13 and 14. The width of the cross-section of the fluorescent tracks of shown in FIGS. 13 and 14 also illustrate the diffraction limited resolution of confocal imaging technique of the present invention.

The angle of the track propagation is determined by processing of several image fields obtained at different depths bellow the crystal surface. Information on the angle of the track orientation combined with the results from the angular dependence of the fluorescent intensity allow quantitative processing of fluorescent tracks having random incident angles with respect to the crystal surface (see FIG. 5).

In yet another embodiment of the present invention, the luminescent materials and confocal fluorescent imaging techniques provide means to detect and image tracks incident at an angle to the normal of crystal surface. The amplitude of an ion track is found to be highly dependent on the direction of track propagation relative to the optical axis k of the objective lens. Schematic diagrams of the two of the many possible orientations of the track, laser beam and the focal spot of a confocal imaging system in accordance with one embodiment of the present invention are presented in FIGS. 15 and 16.

Figure 15:
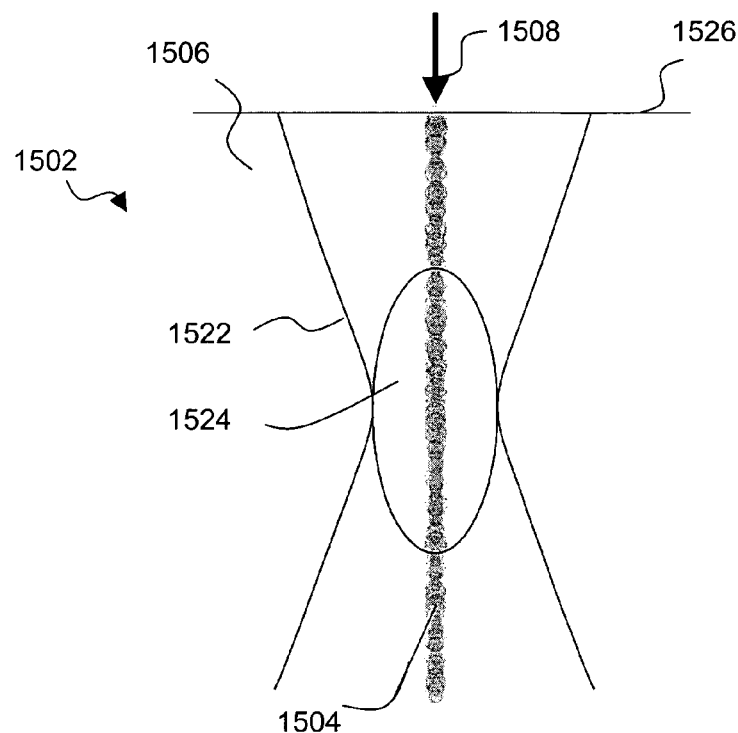
FIG. 15 is a schematic diagram of track imaging in a crystal for an ion track that is parallel to an optical axis of an objective lens in accordance with an embodiment of the present invention.
Figure 16:
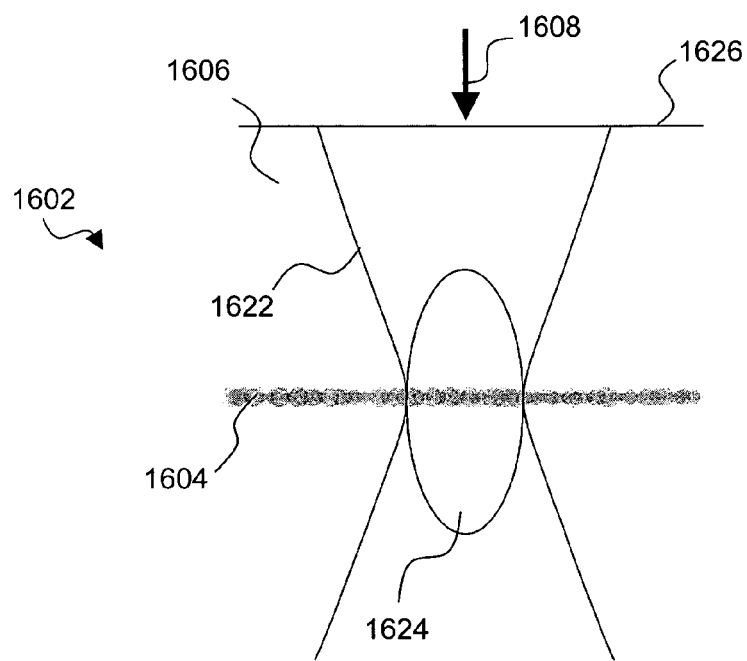
FIG. 16 is a schematic diagram of track imaging in a crystal for an ion track that is perpendicular to an optical axis of an objective lens in accordance with an embodiment of the present invention.

FIG. 15 shows an orientation 1502 in which an ion track 1504 in a crystal 1506 is parallel to an optical axis, indicated by arrow 1508, of an objective lens (not shown). A focused laser beam having an hour-glass shape 1522 has an ellipsoidal focal spot 1524 that intersects ion track 1504 along the long axis of focal spot 1524 and produces high intensity fluorescence. Crystal 1506 has an exterior a surface 1526. FIG. 16 shows another orientation 1602 in which an ion track 1604 in a crystal 1606 is perpendicular to an optical axis, indicated by arrow 1606, of an objective lens (not shown). Hour-glass shaped focused laser beam 1622 has a focal spot 1624 that intersects ion track 1604 along the short axis of focal spot 1624 and produces less fluorescence than in the configuration illustrated by FIG. 15. Crystal 1606 has an exterior a surface 1626.

The difference in fluorescence intensity between two cases illustrated by FIGS. 15 and 16 depends on the numerical aperture (NA) of the objective lens and in case 0.85NA fluorescence is 5 times stronger when the track propagates along the objective lens axis in comparison with case illustrated by FIG. 16. For other angles of track propagation the fluorescence intensity is in between these two outermost cases and is a function of angle of incidence.

To provide the image processing capabilities for tracks entering the luminescent material at different angles, multiple image templates are constructed and used for track identification and the intensity of each individual track is then corrected by the angle of the incidence. It is found that the track fluorescence amplitude does not depend on the direction of track propagation relative to the optical c-axis of the crystal. The actual diameter of an HCP track is on the order of 10–50 nm and is significantly smaller than the focused diffraction limited laser beam. Nevertheless the density of ionization within the track is high enough to allow for imaging of single tracks with a laser spot having the diameter of 650 nm. The area of a single track produced by a recoil proton and imaged with the fluorescence technique is on the order of 1 to 10 $\mu m^2$ depending on the angle of incidence. This allows imaging of statistically distributed tracks without significant overlap with a density up to 500 tracks per imaged field. This translates into a maximum track density of 50,000 $mm^{-2}$ corresponding to a saturation dose from fast neutrons equal to 2.5 Sv. The maximum estimated imaged track density for $Al_2O_3$:C,Mg is higher than that for routine measurements using plastic CR-39 track detectors by at least a factor of 1000.

Recoil protons resulting from the interaction of neutrons with polyethylene (PE) have a significantly smaller LET and therefore a longer projected range. Some of the images show tracks of recoil protons generated in the PE radiator close to the PE-crystal interface and entering the crystal at varying angles. The length of these tracks obtained by 3D image reconstruction, as explained in the next section, gives a maximum range of at least 140 μm. The optical system used has a limitation for spherical aberration compensation to 140 μm and imaging at higher depths is restricted. The average neutron energy in the spectrum from an AmBe source is around 5 MeV with a maximum energy of 10 MeV. The energy of the recoil protons produced by elastic collisions in the PE radiator adjacent to the crystal surface will have a different energy distribution but some collisions should result in complete transfer of the neutron energy to a proton. The projected range for a 5 MeV proton in $Al_2O_3$ equal to 120 μm is obtained from the SRIM-2003 software package developed by Ziegler, J. F. and Biersack, J. P.

Figure 17:
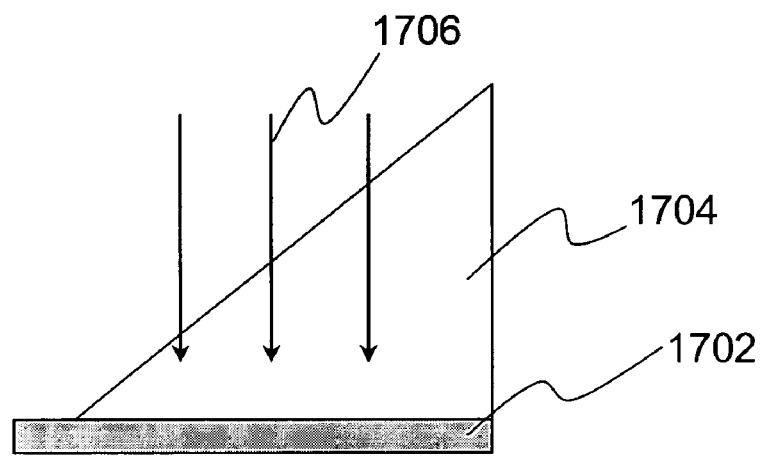
FIG. 17: is a schematic diagram of a passive LET spectrometer with irradiation performed through a variable thickness wedge absorber.
Figure 18:
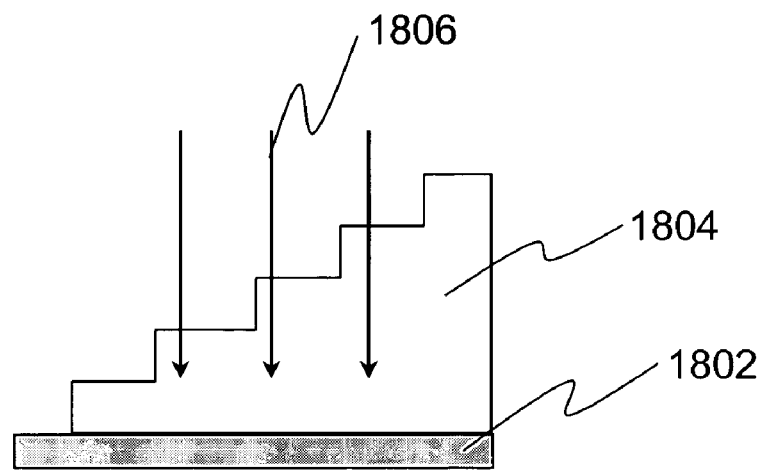
FIG. 18: is a schematic diagram of a passive LET spectrometer with irradiation performed through variable thickness incremental step absorber.

In an embodiment of the present invention illustrated in FIG. 17 a luminescent material 1702 is provided in combination with a heavy charged particle energy absorber 1704 in order to obtain spectroscopic information about the energy of ions 1706 being analyzed. As can be seen in FIG. 17, absorber 1704 has a variable thickness and is wedge-shaped. In another embodiment of the present invention illustrated in FIG. 18 a luminescent material 1802 is provided in combination with a heavy charged particle energy absorber 1804 in order to obtain spectroscopic information about the energy of ions 1806 being analyzed. As can be seen in FIG. 18, absorber 1804 has a variable thickness and has an incremental step shape.

In the embodiments of both FIG. 17 and FIG. 18, the interaction of the heavy charged particles with the variable thickness absorber reduces the energy of the heavy charged particles incident on the luminescent material. The absorption properties of the different materials that may be used in the absorber are known or may be known from experiments and calculations and may provide a controlled way for changing the energy of the heavy charged particles. High energy particles penetrate an absorber to a known maximum penetration range and the corresponding distribution of ion tracks along the luminescence crystal may then be processed to determine the maximum range and distribution of fluorescent intensities. The obtained distribution of tracks and their intensities may be used to calculate the spectra of incident ions.

High energy ions penetrating through the absorber loose their energy and eventually stop at a certain depth. Maximum energy of the particle is released and maximum density of ionization occurs at the end of the range and produces so-called Bragg peak. Experimental demonstration of the Bragg peak of energy deposition by heavy charge particles is illustrated by a graphical plot indicated by arrow 1902, shown in FIG. 19. The data is obtained utilizing passive spectrometer with $Al_2O_3$:C,Mg crystal and brass wedge absorber. Track amplitude as a function of absorption depth in brass for irradiation with Kr-ions having energy 400 MeV per nucleon is shown in comparison with the dependence of LET in brass, indicated by arrow 1904 and is obtained from calculations using SRIM-2003 software package. As shown by a second graphical plot of FIG. 19, indicated by arrow 1904, there is no significant saturation of the fluorescent signal in the luminescent material (i.e., the $Al_2O_3$:C,Mg crystal) when irradiated with Kr ions having an LET in $Al_2O_3$ (estimated from SRIM-2003 calculations) as high as 15,000 keV/μm.

Figure 23:
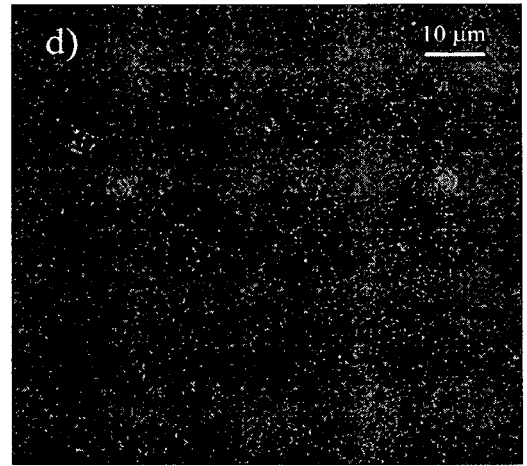
FIG. 23 is a fluorescent image of individual tracks obtained using a sample covered by masking tape during alpha irradiation from $^{241}$Am source.

FIGS. 20–23 are four fluorescent images of individual tracks obtained under the following conditions: a) direct irradiation of a crystal with alpha particles from $^{241}$Am source (FIG. 20); b) a sample covered with a $^6$LiF converter and irradiated with thermal neutrons from a moderated AmBe source (FIG. 21); c) a sample behind a polyethylene radiator and irradiated with a AmBe fast neutron source (FIG. 22); and d) a sample covered by masking tape during alpha irradiation from $^{241}$Am source (FIG. 23). The experimental conditions under which these results are obtained are described in greater detail below.

Compared to prior detectors and methods for detecting and imaging tracks from heavy charged particles and neutrons, the present invention provides several advantages. The luminescent materials, particularly when combined with the confocal fluorescent detection, can provide a high sensitivity, high detection efficiency technique for neutron and heavy charged particle dosimetry. The high ionization density within the heavy charged particle track, the high sensitivity of some crystals and the high resolution fluorescence imaging allow for reliable track detection with up to 100% discrimination from gamma radiation. For example, high energy ions with LET in water as low as 0.5 keV/μm and as high 2400 keV/μm can be detected.

In one embodiment, the method of the present invention may perform passive type of LET and particle charge spectroscopy utilizing an array of absorbers having different thickness and stopping power. The method of the present invention also unique in its ability to obtain 3D spatial distribution of the fluorescent intensity and 3D optical imaging of single heavy charged particle tracks, allowing for the exact angle of the particle incidence to be obtained and the correction of the fluorescent amplitude on this angle to be performed. The method of the present invention is also capable of performing high spatial resolution imaging of radiation fields having high gradients and produced by beta and gamma sources, for example by hot particles of radioactive materials.

The method of the present invention, because it is all-optical, does not require any wet chemical processing, and allows for an easy automatic image processing. The detectors used in this method are not sensitive to ambient room light before, during or after irradiation, and allow for non-destructive imaging multiple times. The short fluorescent lifetimes involved allow for fast laser scanning and high productivity imaging. Due to the small size of the tracks, the saturation fluorescence and saturation of absorbed dose is many times higher than that for etch-type plastic nuclear track detectors.

The present invention will now be further illustrated through the specific examples described below that are meant to be representative of the materials and procedures described above, but should not be considered to as limiting thereof.

EXAMPLES

Example I

Samples of a $Al_2O_3$:C,Mg crystal in the form of plates with dimensions 18 mm×10 mm×1.6 mm are cut along the optical c-axis and polished on the larger opposing sides to obtain optically transparent surfaces. The concentration of Mg in the crystal determined by spectral analysis is 27 ppm.

The "as-grown" crystal has a green coloration due to the optical absorption band at 435 nm with an absorption coefficient of 3 cm$^{-1}$.

One crystal is prepared for alpha-particle irradiations and one half of it is covered with the masking tape having thickness greater than the penetration range of alpha particles from $^{241}$Am source. Two other dosimeter configurations of Al$_2$O$_3$:C,Mg single crystals with neutron converters are also used. The first configuration involves covering the crystal with $^6$LiF and $^7$LiF converters for thermal neutron measurements. The second configuration involves covering the crystal with a 1 mm thick high density polyethylene converter for the production of recoil protons during fast neutron irradiation.

Irradiations of the single crystal detectors are performed with alpha particles, as well as fast and thermal neutrons. An $^{241}$Am alpha source is calibrated with a thin window proportional counter whose own calibration is traceable to the US National Institute of Standards and Technology. The source has an alpha particle emission rate at the surface of 0.012 s$^{-1}$ mm$^{-2}$ and gives a counter pulse rate per unit area of 0.0084 s$^{-1}$ mm$^{-2}$. Fast neutron irradiations are performed at a distance of 200 mm from a bare AmBe source having an activity of 185 MBq. Thermal neutrons are produced by an AmBe source having an activity of 37 MBq and inserted in a paraffin moderator with a distance of 180 mm between the dosimeter and the source. Other irradiations of the Al$_2$O$_3$:C,Mg crystals are performed with alpha particles from a laboratory grade $^{241}$Am source having activity around 1 μCi. To obtain irradiated and non-irradiated regions, exposures to alpha particles are performed through the mask.

Fluorescence measurements are performed using an experimental setup as schematically shown in FIG. 1. Images in fluorescent contrast from the Al$_2$O$_3$:C,Mg crystals irradiated with alpha particles, thermal and fast neutrons are obtained and are shown in FIGS. 20–23. Image processing utilizing Fast Fourier Transforms is done according to the algorithm described above and as illustrated by FIGS. 7-12.

Example II

Figure 24:
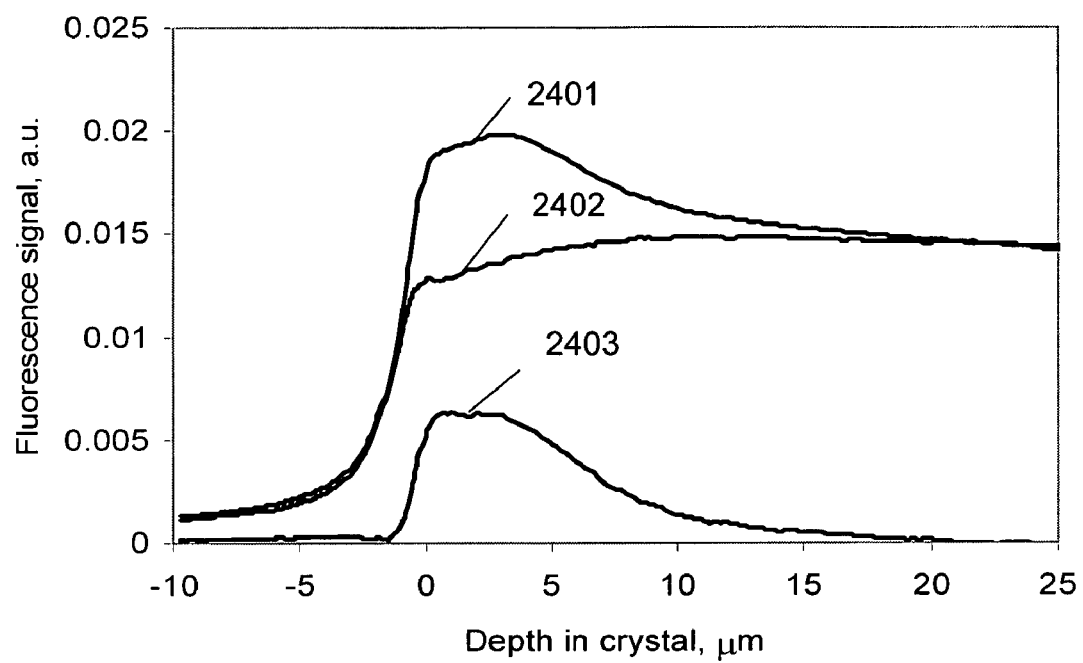
FIG. 24 is a graphical plot of an average fluorescent signal as a function of depth irradiation (curve 2401) of a $Al_2O_3$:C,Mg crystal (crystal surface at 0 μm on the graphical plot) after a high dose alpha, and also showing the depth distribution of the fluorescence signal from the masked part of the crystal representing the background signal (curve 2402) and the difference (curve 2403), representing only the radiation induced fluorescence without the background.

To obtain a depth distribution of the fluorescent signal after alpha particle irradiation, Al2O3:C,Mg crystals are irradiated with a high fluence of alpha particles from an $^{241}$Am source. The images in FIGS. 3 and 4 show the distribution of fluorescent intensity as a function of depth (XZ-scan) in the crystal before (FIG. 4) and after (FIG. 3) the irradiation. As shown in FIGS. 3 and 4, the individual and overlapping tracks can be easily seen. The average depth distribution of the fluorescent signal is graphically plotted in FIG. 24, where the curve indicated by arrow 2401 represents the signal after alpha irradiation, the curve indicated by arrow 2402 is the signal from the masked crystal and the curve 2403 is the difference of two curves 2401 and 2402. The maximum average fluorescence is measured at depths between 1 and 3 μm below the surface; individual tracks perpendicular to the crystal surface have a maximum range of 14–17 μm. According to calculations performed using SRIM-2003 software (Ziegler et al., SRIM-2003.20 software package), the projected range of 5.5 MeV alpha particles in Al$_2$O$_3$ is 15 μm and the LET is equal to 250 keVμm−1. At depths greater than 15 μm, the fluorescent signal from the alpha-irradiated crystal is not higher than the background fluorescence, indicating that the contribution of 60 keV gamma-rays from $^{241}$Am is insignificant. This demonstrates a very important advantage of the method of the present invention for neutron/gamma discrimination.

Example III

The sensitivity and the detection efficiency of the method of the present invention is demonstrated by the imaging of single tracks after short time exposure with alpha particles from an $^{241}$Am source of known low emission rate, to determine whether an image of single tracks can be obtained, and to distinguish the fluorescent signal produced within the track from the background fluorescence. The known fluence of alpha particles provides an estimate of the detection efficiency of the new technology. The Al$_2$O$_3$:C,Mg crystals are exposed to alpha particles from a $^{241}$Am source having an assumed uniform deposition within a 18 mm radius. The calibration data indicates a flux of 0.0085 s$^{-1}$ mm$^{-2}$ at a distance of 5 mm from the source. The exposure time is 64.32 hours and the delivered fluence of alpha particles is 1968 mm$^{-2}$. Based on the data from FIG. 24, the optimum depth for imaging the majority of tracks incident on the sample at different angles is determined to be 3 μm below the surface.

Figure 20:
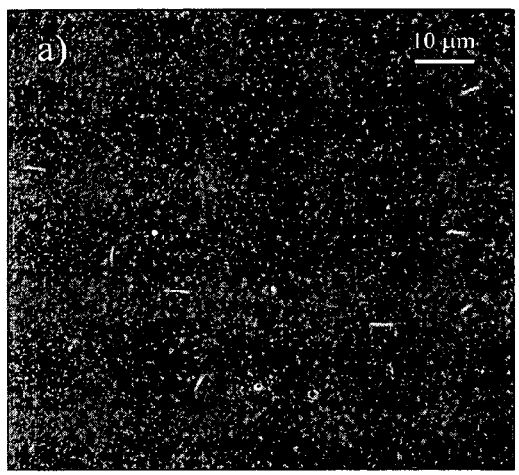
FIG. 20 is a fluorescent image of individual tracks obtained by direct irradiation of a crystal with alpha particles from $^{241}$Am source.
Figure 21:
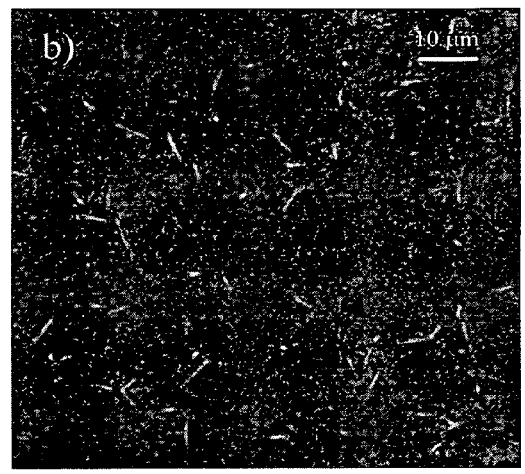
FIG. 21 is a fluorescent image of individual tracks obtained using a sample covered with a $^6$LiF converter and irradiated with thermal neutrons from a moderated AmBe source.
Figure 22:
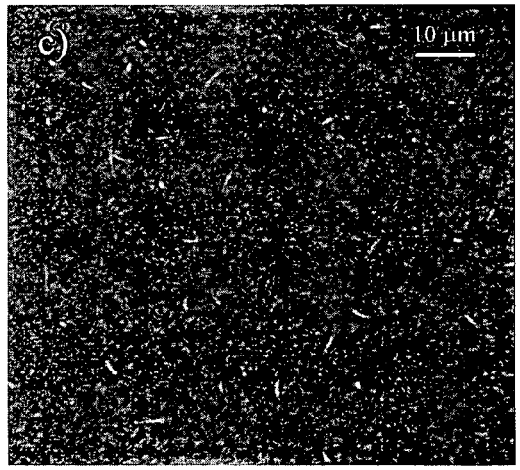
FIG. 22 is a fluorescent image of individual tracks obtained using a sample behind a polyethylene radiator and irradiated with a AmBe fast neutron source.

An example of a fluorescent image having a 90×90 μm$^2$ field of view is shown in image a) of FIG. 20. Eleven tracks can be easily seen. A total of 50 images are acquired and processed. The average track density is equal to 1500±150 mm$^{-2}$ or about 76% of the estimated particle fluence incident on the sample. At the scan depth of 3 μm some of the tracks produced by alpha particles incident on the sample at glancing angles can not be imaged and consequently counted. In addition some alpha particles may backscatter from the surface. Both effects should reduce the detection efficiency. The part of the crystal covered by masking tape did not reveal any tracks and shows only uniform background fluorescence, as shown in image d) of FIG. 23.

Example IV

To determine the sensitivity of the present invention to thermal neutrons, Al$_2$O$_3$:C,Mg crystals are packaged in direct contact with a radiator made from a thermoluminescent detector $^6$LiF (Harshaw TLD-600). For comparison, the same crystal is covered by a $^7$LiF detector (Harshaw TLD-700). Thermal neutron irradiations are performed with the moderated AmBe source as described in EXAMPLE I above. An image obtained from the part of the Al$_2$O$_3$:C,Mg crystal covered with the $^6$LiF radiator is shown in image b) of FIG. 21. The delivered dose is equal to 1.6 mSv and the average track density obtained by imaging 10 fields with a 90×90 μm$^2$ field of view is equal to 6100±413 mm$^{-2}$ mSv$^{-1}$.

The low limit of detection is estimated as a 3 s. d. of the track density and corresponds to 0.2 mSv. The nuclear reaction of a thermal neutron with $^6$Li results in production of two energetic heavy charged particles: an alpha particle and a tritium ion:

$$^6Li + {}^1n \rightarrow {}^4He\ (2.05\ MeV) + {}^3H\ (2.73\ MeV) \qquad (1)$$

According to calculations using SRIM-2003 software, 2 MeV alpha particles in Al$_2$O$_3$ have an LET equal to 448 keVμm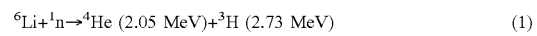 and a projected range of only 4 μm, whereas 2.8 MeV tritium ions have an LET equal to 78 keVμm$^{-1}$ and a longer projected range of 24 μm. Layer by layer imaging of the irradiated sample under the $^6$LiF radiator reveals some tracks propagating perpendicular to the crystal surface to a depth of up to 25 μm. Thus the present invention can distinguish between the alpha tracks and tritium ions tracks. The track density behind the $^7$LiF radiator is equal to 11 tracks per image or 670 mm$^{-2}$mSv$^{-1}$. The detection of tracks in the later case is attributed to the assumption that enrichment of $^7$Li is not 100%.

Example V

Fast neutron irradiations are performed using bare AmBe source. An Al$_2$O$_3$:C,Mg crystal is covered with polyethylene radiator. An example of the images obtained in fluorescent contrast after fast neutron irradiations with a PE radiator is shown in image c) of FIG. 22. The peak in neutron energy spectrum of AmBe source is around 5 MeV and estimated sensitivity of the tested detectors and imaging apparatus is equal to 21±4 tracks.mSv$^{-1}$.mm$^{-2}$.

Example VI

Three-dimensional (3D) reconstruction of tracks is achieved by combining images obtained at different depths in the crystal. The confocal geometry of the experimental setup and the 0.85NA objective lens with spherical aberration compensation allows for a depth of view of about 3 µm. Images of single tracks are obtained at depths between 5 and 140 µm with 5 µm increments between imaged layers. An example of a 3D track reconstruction for a recoil proton is shown in FIG. 5 from which both the range and the angle of incidence can be determined. The maximum length of tracks from recoil protons is found to be around 140 µm. Preliminary statistical analysis of track lengths produced by the $^{241}$Am alpha particles gave a maximum range of 14 µm. The maximum range of tracks produced by the tritium ion from $^6$Li(n,α+$^3$H) reaction is estimated to be around 25 µm.

Example VII

The spectroscopic capability of the present invention is demonstrated using accelerated ions. It is shown that the method allows detecting and distinguishing different types of heavy ions with very low and extremely high LET. The irradiations with high energy heavy ions including $^1$H, $^4$He, $^{12}$C, $^{20}$Ne, $^{56}$Fe and $^{84}$Kr are performed using a Heavy Ion Medical Accelerator (HIMAC) operating at National Institute of Radiological Sciences of Japan. To obtain a reliable distribution of fluorescent amplitudes several hundred images containing a total of around 5000 tracks for each type of ion are obtained and processed according to the image processing algorithm described below.

The amplitude of the fluorescent signal A is measured in mV at the output of the avalanche photo-detector connected to transimpedance amplifier and can be transferred into fluorescent photon rate incident on the photo-detector as:

$$\gamma = \frac{A}{\varepsilon X} \quad (2)$$

using photo-electric sensitivity of the APD detector at 800 nm $\varepsilon=1.5\times10^8$ V/W and conversion coefficient for 750 nm photons $x=2.64\times10^{-19}$ J/photon. For the APD used in the experiment a 10 mV signal amplitude corresponds to a photon rate of $2.5\times10^8$ photon/s.

Figure 25:
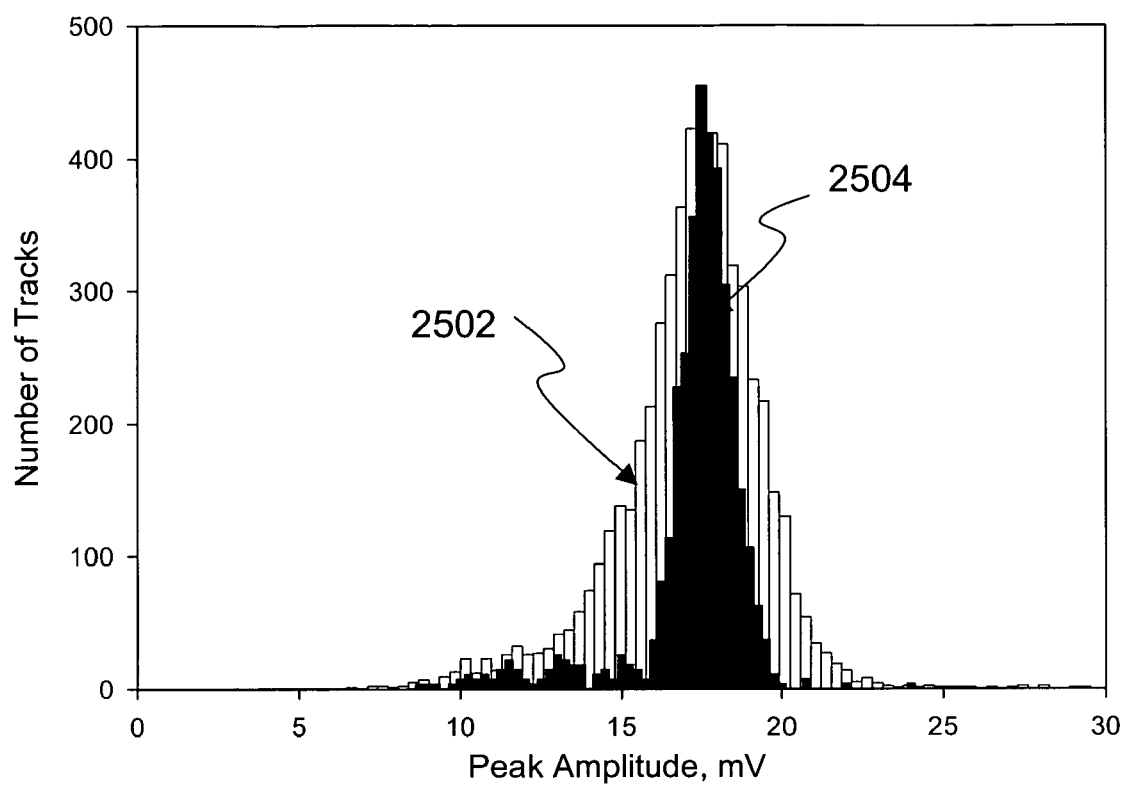
FIG. 25 is a histogram of fluorescent peak amplitudes for Kr ions without and with 7-point averaging along each individual track.

The initially obtained distribution of track amplitudes for all detected Kr ions has a line-width (FWHM) of 5 mV, or about 25% of the average fluorescent amplitude value (see histogram 2502 of FIG. 25). Fluorescence from the track is measured in the confocal configuration from a very small volume in the crystal, i.e., less than 1 µm$^3$. One of the reasons for such a wide distribution appears to be nonuniformity of color center and trap distributions and the stochastic nature of energy deposition along the ion track. To increase the spectral resolution, an averaging technique is used. By obtaining several images of the same area of the crystal at different depths in the crystal and by averaging several data points along the same track, a much better peak distribution is obtained. To accomplish this task, the same XY field is scanned at several different depths below the crystal surface with 3 µm increments. By correlating track coordinates from multiple images using a specially developed image analysis algorithm, the average fluorescent amplitude for each individual track is obtained. The amplitude distribution 2504 for Kr ions obtained after averaging 7 points for each track is shown in FIG. 25. As a result of correlated image processing the line width for Kr ions is decreased almost 2 times.

The same imaging and averaging techniques as described above are applied to other crystal detectors irradiated with $^1$H, $^4$He, $^{12}$C, $^{20}$Ne, $^{56}$Fe and $^{84}$Kr-ions (see FIG. 6). A relatively narrow width of the peaks in the histogram suggests that satisfactory discrimination between ions is possible

Example VIII

Figure 19:
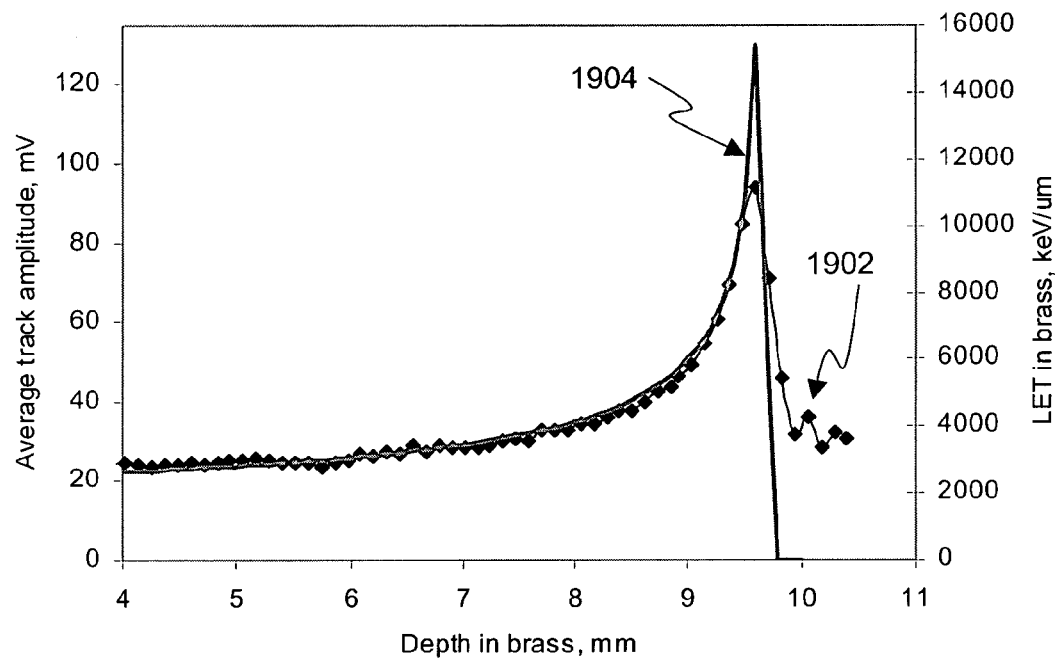
FIG. 19 is a graphical plot of a Bragg peak of energy deposition by heavy charged particles from data obtained on a $Al_2O_3$:C,Mg crystal irradiated through a brass wedge absorber with Kr-ions having energy 400 MeV per nucleon by utilizing a passive spectrometer, and showing the track amplitude as a function of absorption depth in brass, and compared with the LET in brass obtained from calculations using a SRIM-2003 software package.
Figure 26:
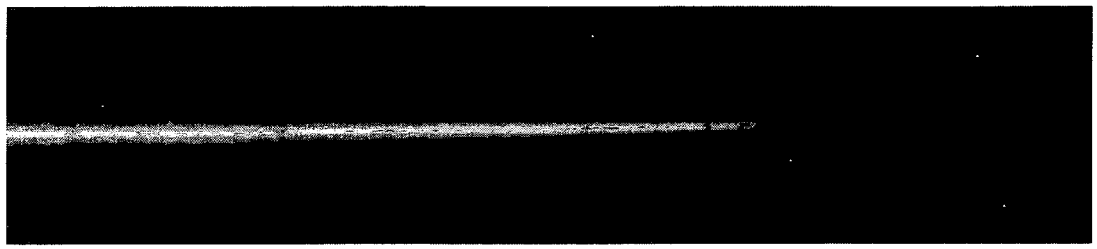
FIG. 26 is an image of a single track produced by a Kr ion penetrating and stopping in a $Al_2O_3$:C,Mg crystal at the end of the range to illustrate the high sensitivity and high spatial resolution of detection method in accordance with one embodiment of the present invention.

To demonstrate spectroscopic capabilities of the present invention and to determine the track fluorescence amplitude dependence on energy and LET for the same type of ion, an Al$_2$O$_3$:C,Mg crystal sample is attached to differently shaped brass wedges as shown in FIGS. 17 and 18. The brass wedges in front of each sample act as an absorber of the 400 MeV/n Kr ions. By imaging the sample near the crystal surface adjacent to the brass wedge at different lateral positions corresponding to certain wedge thicknesses, a plot of track amplitude versus absorbing brass thickness is obtained. FIG. 19 shows the dependence of average fluorescence amplitude on wedge thickness. Each point is obtained by averaging the amplitudes of tracks obtained from 10 image fields along a strip on the sample corresponding to a particular wedge thickness. The solid line, indicated by arrow 1904, in FIG. 19 is a simulation of the LET dependence on depth in brass, calculated using SRIM-2003 software. The number of ions detected per 90×90 µm field as a function of depth in brass is constant within statistical uncertainty until the ions penetrate the depth equivalent to the maximum range of these ions in brass, which coincides with the range calculated using SRIM-2003 and is 9.5 mm. Another example of the imaging capabilities of the present invention is shown in the image in FIG. 26 of a single Kr-ion partially slowed down by a brass absorber, penetrating along the Al$_2$O$_3$:C,Mg crystal detector surface, and finally came to stop.

Example IX

The ability of the present invention to detect ions with low LET below 10 keV/µm is evaluated. Al$_2$O$_3$:C,Mg crystals are irradiated with 143 MeV/n He ions having 2.1.keV/µm and 70 MeV protons having 1.1 keV/µm in water are imaged and processed using the same algorithm described above in EXAMPLE VII (see FIG. 6). It is determined that 250 MeV protons with LET as low as 0.5 keV/µm in water can be detected and imaged. This detection limit is similar to that of Si-detectors and is significantly lower than that of CR-39, which has a limit of around 5 keV/µm.

Example X

Experiments were conducted using the confocal imaging systems set-up of FIG. 1 for two cases of track orientation as shown in FIGS. 15 and 16. A consideration for quantitative processing of fluorescent tracks in $Al_2O_3$:C,Mg crystals is mutual orientation of the track, optical axis of the objective lens, polarization of the excitation laser light and the optical c-axis of the crystal. $Al_2O_3$:C,Mg crystals have a strong anisotropy of optical absorption and fluorescence. In all experiments, the optical c-axis of the crystal has the same orientation with respect to the laser light polarization, such that the fluorescence intensity is maximized.

It is found that the track amplitude does not depend on the direction of track propagation relative to the optical c-axis of the crystal. Alternatively the amplitude of an ion track is found to be highly dependent on the direction of track propagation relative to the optical axis 1508 or 1608, respectively, of the objective lens.

It is found experimentally that the fluorescent signal amplitude is on average 5 times greater when the direction of track propagation is parallel to the optical axis of the objective lens than when the direction of the track propagation is perpendicular to it. The spatial resolution of the diffraction limited confocal system is 0.6 µm in the lateral direction and 3 µm in axial direction when using a 635 nm read laser and 0.85NA objective lens. The amount of fluorescence collected for the track propagating in the axial direction of the lens is therefore about 5 times greater than that for the track propagating in the lateral direction. Because a track can be considered as a linear structure relative to the size of the focal spot, the amount of fluorescence collected from the track strongly depends on the angle which the track makes with the optical axis.

Example XI

The example demonstrates the ability of one embodiment of the method of the present invention to erase radiation-induced fluorescent tracks from the luminescent crystal and the ability to reuse the luminescent crystal over and over. In U.S. Patent Application No. 2004-0159803 to Akselrod et al., filed, Feb. 2, 2004, the entire contents and disclosure of which is hereby incorporated by reference, it was shown that gamma and beta radiation-induced signals in $Al_2O_3$:C,Mg are thermally stable up to at least 600° C. At higher temperatures the fluorescence starts to decrease and may be completely removed at 680° C. The reusability of $Al_2O_3$:C, Mg single crystal detectors irradiated with heavy charged particles is tested by thermally annealing them in air at 680° C. for 10 min. Imaging of the annealed crystal does not show any residual tracks and is a confirmation that $Al_2O_3$:C,Mg crystal detectors can be used multiple times. Repeated irradiations of the annealed crystal with alpha particles show no degradation of luminescent properties and imaging performance.

Example XII

Figure 27:
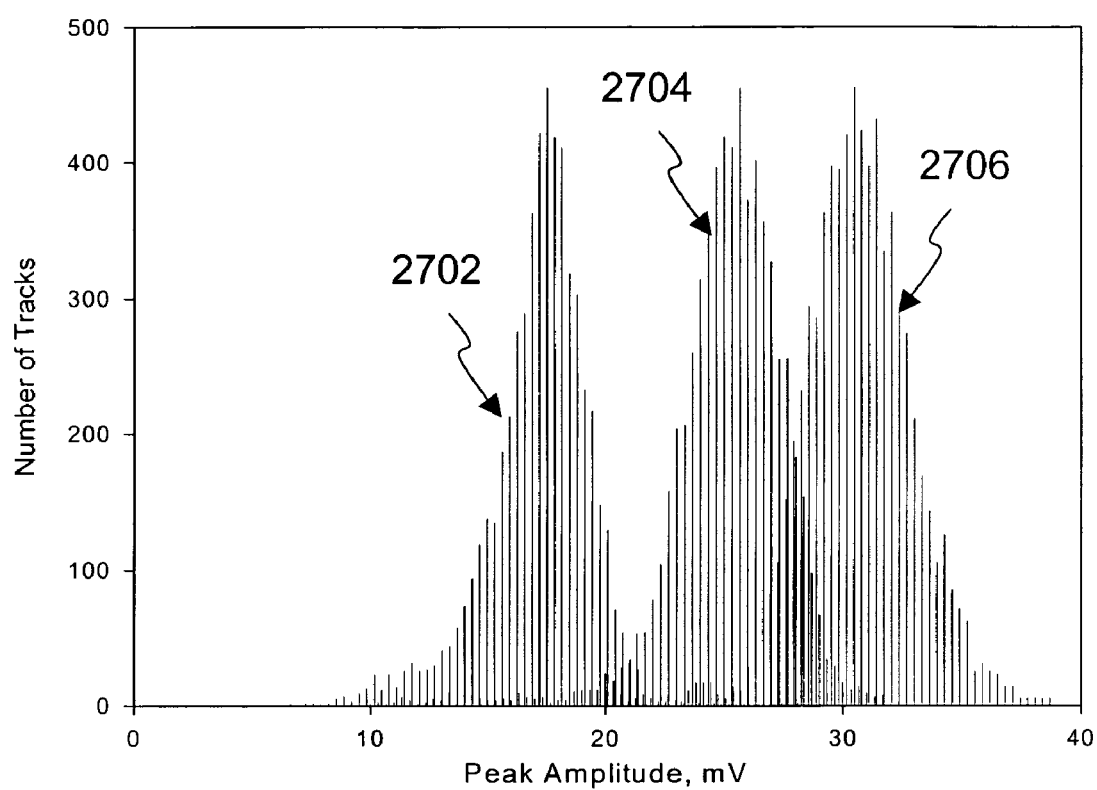
FIG. 27 is a graphical plot of the distribution of track amplitudes in three crystals with different concentrations of color centers and irradiated with 290 MeV/n C ions, the concentration of color centers of the respective crystal being represented by coefficient of optical absorption K of the 435 nm band and equal to 1.45 $cm^{-1}$, 2.69 $cm^{-1}$ and 4.31 $cm^{-1}$, and indicated by arrows 2702, 2704, and 2706 respectively.

Three sets of samples having different concentrations of Mg associated color centers [$F_2^{2+}$(2Mg)-centers] are investigated. The concentration of the color centers in the crystal is determined using optical absorption measurements and is characterized by absorption coefficient K. It is found that the amplitude of the radiation induced fluorescent signal increases with the color center concentration as shown in FIG. 27 for the amplitudes of tracks obtained for 290 MeV/n C ions. Fluorescent amplitude distributions for samples having K equal to 1.45 $cm^{-1}$, 2.7 $cm^{-1}$ and 4.3 $cm^{-1}$ are indicated by arrows 2702, 2704 and 2706 respectively. Similar results are obtained for other ions.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

It is important to emphasize that the invention is not limited in its application to the detail of the particular material and technological steps illustrated herein. The invention is capable of other embodiments and of being practiced or carried out in a variety of ways. It is to be understood that the phraseology and terminology employed herein is for the purpose of description and not of limitation.

What is claimed is:

1. A method comprising the steps of:
    (a) exposing an irradiated luminescent material to a light source to thereby form an excited luminescent material, the irradiated luminescent material comprising a luminescent material that has been irradiated with one or more heavy charged particles, the heavy charged particles producing respective tracks in the luminescent material;
    (b) measuring the spatial distribution of fluorescence from the excited luminescent material; and
    (c) producing one or more high spatial resolution images of the tracks of the one or more heavy charged particles based on the spatial distribution of fluorescence, wherein the luminescent material is radiochromic.

2. The method of claim 1, wherein step (c) comprises signal processing the spatial distribution of fluorescence to thereby produce the one or more high spatial resolution images.

3. The method of claim 1, further comprising signal processing the spatial distribution of fluorescence to thereby determine one or more parameters for the one or more heavy charged particles.

4. The method of claim 1, further comprising signal processing the spatial distribution of fluorescence to thereby determine a dose of radiation absorbed by the luminescent material from the one or more heavy charged particles.

5. The method of claim 1, wherein step (b) comprises discrimination between a first signal and a second signal and separation of the first signal and the second signal, wherein the first signal is based on a different type of radiation than the second signal is based on.

6. The method of claim 5, wherein the first signal is based on radiation from the one or more heavy charged particles and the second signal is based on penetrating photon and/or beta radiation.

7. The method of claim 1, wherein the irradiated luminescent material is inorganic.

8. The method of claim 7, wherein the irradiated luminescent material comprises a crystalline metal oxide.

9. The method of claim 8, wherein the crystalline metal oxide comprises one or more oxygen vacancy defects.

10. The method of claim 9, wherein the crystalline metal oxide comprises $Al_2O_3$.

11. The method of claim 10, wherein the luminescent material further comprises magnesium.

12. The method of claim 11, wherein the luminescent material further comprises carbon.

13. The method of claim 10, wherein the light source has wavelength centered at 620±40 nm.

14. The method of claim 10, wherein the fluorescence from the excited luminescent material has a wavelength centered at 750±60 nm.

15. The method of claim 10, wherein the light source has wavelength centered at 335±40 nm.

16. The method of claim 10, wherein the light source has wavelength centered at 435±40 nm.

17. The method of claim 10, wherein the fluorescence from the excited luminescent material has wavelength centered at 520±60 nm.

18. The method of claim 1, wherein the irradiated luminescent material comprises an organic material.

19. The method of claim 1, wherein step (b) is performed using confocal detection.

20. The method of claim 1, further comprising the following step:
(d) irradiating the luminescent material with the one or more heavy charged particles to thereby form the irradiated luminescent material.

21. The method of claim 20, wherein step (d) is performed with the particles of known type, energy and angle of incidence.

22. The method of claim 21, further comprising: calibrating a device by obtaining parameters of signal processing for step (c) based on the spatial distribution of fluorescence measured in step (b).

23. The method of claim 20, wherein the one or more heavy charged particles comprise recoil ions.

24. A method comprising the steps of:
(a) irradiating one or more neutron converters with neutron radiation to thereby produce one or more heavy charged particles;
(b) irradiating a luminescent material with the heavy charged particles to thereby form an irradiated luminescent material, the heavy charged particles producing respective tracks in the luminescent material;
(c) exposing the irradiated luminescent material to a light source to thereby form an excited luminescent material;
(d) measuring the spatial distribution of fluorescence from the excited luminescent material;
(e) producing one or more high spatial resolution images of the tracks of the one or more heavy charged particles based on the spatial distribution of fluorescence; and
(f) detecting the neutrons based on the one or more high spatial resolution images of the tracks in step (e), wherein the luminescent material is radiochromic.

25. The method of claim 24, further comprising signal processing the spatial distribution of fluorescence to thereby determine one or more parameters for the neutron radiation.

26. The method of claim 24, further comprising signal processing the spatial distribution of fluorescence to thereby determine a dose of the neutron radiation.

27. The method of claim 24, wherein one or more neutron converters comprise hydrogen atoms.

28. The method of claim 24, wherein the one or more neutron converters comprise atoms of isotopes of $^6$Li, and wherein the neutrons interact with the isotopes of $^6$Li to thereby produce the one or more heavy charged particles.

29. The method of claim 24, wherein the one or more neutron converters comprise isotopes of $^{10}$B, and wherein the neutrons interact with the isotopes of $^{10}$B to thereby produce the one or more heavy charged particles.

30. The method of claim 24, wherein the one or more neutron converters are located on one side of the luminescent material, and wherein an opposite side of the irradiated luminescent material is exposed to the light source.

31. A method comprising the steps of:
(a) exposing an irradiated luminescent material to a light source to thereby form an excited luminescent material, the irradiated luminescent material comprising a luminescent material that has been irradiated with one or more heavy charged particles, the heavy charged particles producing respective tracks in the luminescent material;
(b) measuring the spatial distribution of fluorescence at two or more depths below the surface of the excited luminescent material; and
(c) producing two or more spatially correlated images based on the respective spatial distributions of fluorescence for the two or more depths, wherein the images are high spatial resolution images and wherein the luminescent material is a radiochromic inorganic material.

32. The method of claim 31, further comprising step of generating two or more spatially correlated images based on the respective spatial distributions of fluorescence for the two or more depths.

33. A method comprising the steps of:
(a) providing a spatial distribution of fluorescence from an excited luminescent material that has been irradiated with heavy charged particles and exposed to a light source, the heavy charged particles producing respective tracks in the luminescent material; and
(b) producing one or more high spatial resolution images of the tracks of the one or more heavy charged particles based on the spatial distribution of fluorescence, wherein the excited luminescent material is radiochromic.

34. The method of claim 33, further comprising signal processing the spatial distribution of fluorescence to thereby determine one or more parameters for the one or more heavy charged particles.

35. The method of claim 33, further comprising signal processing the spatial distribution of fluorescence to thereby determine a dose of radiation absorbed by the luminescent material from the one or more heavy charged particles.

36. The method of claim 33, wherein step (b) comprises discrimination between a first signal and a second signal and separation of the first signal and the second signal, wherein the first signal is based on a different type of radiation than the second signal is based on.

37. The method of claim 36, wherein the first signal is based on radiation from the one or more heavy charged particles and the second signal is based on penetrating photon and/or beta radiation.

38. The method of claim 33,
wherein step (c) comprises signal processing the spatial distribution of fluorescence to thereby produce the one or more images of the tracks for the one or more heavy charged particles.

39. The method of claim 33, wherein the irradiated luminescent material comprises a crystalline metal oxide.

40. The method of claim 39, wherein the crystalline metal oxide comprises one or more oxygen vacancy defects.

41. The method of claim 40, wherein the crystalline metal oxide comprises $Al_2O_3$.

42. The method of claim 41, wherein the luminescent material further comprises magnesium.

43. The method of claim 42, wherein the luminescent material further comprises carbon.

44. A method comprising the steps of:
(a) exposing an irradiated luminescent material to a light source to thereby form an excited luminescent material, the irradiated luminescent material comprising a luminescent material that has been irradiated with one or more hot particles of radiation, the hot particles producing respective tracks in the luminescent material;
(b) measuring the spatial distribution of fluorescence from the excited luminescent material; and
(c) producing one or more high spatial resolution images of the tracks of the one or more hot particles based on the spatial distribution of fluorescence, wherein the luminescent material is radiochromic.

45. The method of claim 44, further comprising the following step:
(d) signal processing the spatial distribution of fluorescence to thereby detect a spatial distribution of radiation dose from the one or more hot particles.

46. The method of claim 44, wherein step (c) comprises signal processing the spatial distribution of fluorescence to thereby produce an image of the spatial distribution of radiation dose from the one or more hot particles.

47. The method of claim 44, further comprising signal processing the spatial distribution of fluorescence to thereby determine one or more parameters for the one or more hot particles.

48. The method of claim 44, further comprising signal processing the spatial distribution of fluorescence to thereby determine a dose of radiation absorbed by the luminescent material from the one or more hot particles.

49. The method of claim 44, wherein the irradiated luminescent material is an inorganic material.

50. The method of claim 44, wherein the irradiated luminescent material comprises a crystalline metal oxide.

51. The method of claim 50, wherein the irradiated luminescent material comprises one or more oxygen vacancy defects.

52. The method of claim 51, wherein the crystalline metal oxide comprises $Al_2O_3$.

53. The method of claim 52, wherein the luminescent material further comprises magnesium.

54. The method of claim 53, wherein the luminescent material further comprises carbon.

55. The method of claim 44, wherein the irradiated luminescent material comprises an organic material.

56. The method of claim 44, further comprising the following step:
(c) irradiating the luminescent material with the one or more hot particles to thereby form the irradiated luminescent material.

57. A method comprising the steps of:
(a) irradiating a luminescent material with one or more heavy charged particles to thereby form the irradiated luminescent material, the heavy charged particles producing respective tracks in the luminescent material;
(b) exposing the irradiated luminescent material to a light source to thereby form an excited luminescent material;
(c) measuring the spatial distribution of fluorescence from the excited luminescent material;
(d) producing one or more high spatial resolution images of the tracks of the one or more heavy charged particles based on the spatial distribution of fluorescence; and
(e) obtaining one or more parameters for each individual heavy charged particle based on the one or more high spatial resolution images, wherein the luminescent material is radiochromic and wherein the one or more heavy charged particles pass through an absorber of heavy charge particles prior to irradiating the luminescent material.

58. The method of claim 57, wherein one of the one or more parameters is the atomic number of the individual heavy charged particle.

59. The method of claim 57, wherein one of the one or more parameters is the energy of the individual heavy charged particle.

60. The method of claim 57, wherein one of the one or more parameters is the range of the individual heavy charged particle.

61. The method of claim 57, wherein one of the one or more parameters is the linear energy transfer of the individual heavy charged particle.

62. The method of claim 57, wherein one of the one or more parameters is the angle of incidence of the individual heavy charged particle.

63. The method of claim 57, wherein the absorber is wedge shaped.

64. The method of claim 57, wherein the absorber in incremental step shaped.

65. The method of claim 57, wherein the absorber is made of two or more materials having different absorption characteristics.

66. The method of claim 57, wherein the irradiated luminescent material is inorganic.

67. The method of claim 66, wherein the irradiated luminescent material comprises a crystalline metal oxide.

68. The method of claim 67, wherein the crystalline metal oxide comprises one or more oxygen vacancy defects.

69. The method of claim 68, wherein the crystalline metal oxide comprises $Al_2O_3$.

70. The method of claim 69, wherein the luminescent material further comprises magnesium.

71. The method of claim 70, wherein the luminescent material further comprises carbon.

72. The method of claim 57, wherein the irradiated luminescent material comprises an organic material.

73. The method of claim 57, further comprising signal processing the spatial distribution of fluorescence to thereby determine a dose of radiation absorbed by the luminescent material from the one or more heavy charged particles.

74. A system comprising:
an irradiated luminescent material that has been irradiated with one or more heavy charged particles, the heavy charged particles producing respective tracks in the luminescent material;
a light source for exposing the irradiated luminescent material to light to thereby form an excited luminescent material;
means for measuring the spatial distribution of fluorescence from the excited luminescent material; and
means for producing one or more high spatial resolution images of the tracks of the one or more heavy charged particles based on the spatial distribution of fluorescence, wherein the irradiated luminescent material is radiochromic.

75. The system of claim 74, further comprising means for signal processing the spatial distribution of fluorescence to thereby determine one or more parameters for the one or more heavy charged particles.

76. The system of claim 74, further comprising means for signal processing the spatial distribution of fluorescence to thereby determine a dose of radiation absorbed by the luminescent material from the one or more heavy charged particles.

77. The system of claim 74, wherein the irradiated luminescent material is inorganic.

78. The system of claim 77, wherein the irradiated luminescent material comprises a crystalline metal oxide.

79. The system of claim 78, wherein the crystalline metal oxide comprises one or more oxygen vacancy defects.

80. The system of claim 79, wherein the crystalline metal oxide comprises $Al_2O_3$.

81. The system of claim 80, wherein the luminescent material further comprises magnesium.

82. The system of claim 81, wherein the luminescent material further comprises carbon.

83. The system of claim 74, wherein the irradiated luminescent material comprises an organic material.

84. A system comprising:
a luminescent material;
one or more neutron converters;
a light source for exposing the irradiated luminescent material to light to thereby form an excited luminescent material;
means for measuring the spatial distribution of fluorescence from the excited luminescent material; and
means for producing one or more high spatial resolution images of the tracks of the one or more heavy charged particles based on the spatial distribution of fluorescence, wherein the luminescent material is radiochromic, and wherein when the one or more neutron converters are exposed to neutron radiation, the one or more neutron converters produce the one or more heavy charged particles that irradiate the luminescent material.

85. The system of claim 84, further comprising means for signal processing the spatial distribution of fluorescence to thereby determine one or more parameters for the neutron radiation.

86. The system of claim 84, further comprising means for signal processing the spatial distribution of fluorescence to thereby determine a dose of the neutron radiation.

87. The system of claim 84, wherein the one or more neutron converters comprise hydrogen atoms.

88. The system of claim 84, wherein the neutron converter comprises atoms of isotopes of $^6Li$.

89. The system of claim 84, wherein the one or more neutron converters comprises isotopes of $^{10}B$.

90. The system of claim 84, wherein the one or more neutron converters are disposed on one side of the luminescent material, and the light source is disposed on an opposite side of the luminescent material.

91. A system comprising:
an irradiated luminescent material that has been irradiated with one or more heavy charged particles, the heavy charged particles producing respective tracks in the luminescent material;
a light source for exposing the irradiated luminescent material to light to thereby form an excited luminescent material;
means for producing one or more high spatial resolution images of the tracks of the one or more heavy charged particles based on the spatial distribution of fluorescence; and
means for measuring the spatial distribution of fluorescence at two or more depths below the surface of the excited luminescent material, wherein the irradiated luminescent material is a radiochromic inorganic material.

92. The system of claim 91, further comprising means for signal processing the spatial distribution of fluorescence to thereby determine one or more parameters for the one or more heavy charged particles.

93. The system of claim 91, further comprising means for signal processing the spatial distribution of fluorescence to thereby determine a dose of radiation absorbed by the luminescent material from the one or more heavy charged particles.

94. The system of claim 91, wherein the irradiated luminescent material comprises a crystalline metal oxide.

95. The system of claim 94, wherein the crystalline metal oxide comprises one or more oxygen vacancy defects.

96. The system of claim 95, wherein the crystalline metal oxide comprises $Al_2O_3$.

97. The system of claim 96, wherein the luminescent material further comprises magnesium.

98. The system of claim 97, wherein the luminescent material further comprises carbon.

99. A system comprising:
an irradiated luminescent material that has been irradiated with one or more hot particles of radiation, the hot particles producing respective tracks in the luminescent material;
a light source for exposing the irradiated luminescent material to light to thereby form an excited luminescent material; and
means for producing one or more high spatial resolution images of the tracks of the one or more hot particles based on the spatial distribution of fluorescence from the excited luminescent material.

100. The system of claim 99, further comprising means for signal processing the spatial distribution of fluorescence to thereby determine one or more parameters for the one or more hot particles of radiation.

101. The system of claim 99, further comprising means for signal processing the spatial distribution of fluorescence to thereby determine a dose of radiation absorbed by the luminescent material from the one or more hot particles of radiation.

102. The system of claim 99, wherein the irradiated luminescent material is inorganic.

103. The system of claim 99, wherein the irradiated luminescent material comprises a crystalline metal oxide.

104. The system of claim 103, wherein the crystalline metal oxide comprises one or more oxygen vacancy defects.

105. The system of claim 104, wherein the metal oxide comprises $Al_2O_3$.

106. The system of claim 105, wherein the luminescent material further comprises magnesium.

107. The system of claim 106, wherein the luminescent material further comprises carbon.

108. The system of claim 99, wherein the irradiated luminescent material comprises an organic material.

109. A system comprising:
a luminescent material;
a radiation source for irradiating the luminescent material with heavy charged particles to thereby form an irradiated luminescent material, the heavy charged particles producing respective tracks in the luminescent material;
an absorber for absorbing at least a portion of the energy of the heavy charged particles, the absorber being disposed between the radiation source and the luminescent material;
a light source for exposing the irradiated luminescent material to light to thereby form an excited luminescent material;

means for measuring the spatial distribution of fluorescence from the excited luminescent material; and means for producing one or more high spatial resolution images of the tracks of the one or more heavy charged particles based on the spatial distribution of fluorescence, wherein the luminescent material is radiochromic.

110. The system of claim 109, further comprising means for signal processing the spatial distribution of fluorescence to thereby determine one or more parameters for the one or more heavy charged particles.

111. The system of claim 109, further comprising means for signal processing the spatial distribution of fluorescence to thereby determine a dose of radiation absorbed by the luminescent material from the one or more heavy charged particles.

112. The system of claim 109, wherein the irradiated luminescent material is inorganic.

113. The system of claim 112, wherein the irradiated luminescent material comprises a crystalline metal oxide.

114. The system of claim 113, wherein the crystalline metal oxide comprises one or more oxygen vacancy defects.

115. The system of claim 114, wherein the crystalline metal oxide comprises $Al_2O_3$.

116. The system of claim 115, wherein the luminescent material further comprises magnesium.

117. The system of claim 116, wherein the luminescent material further comprises carbon.

118. The system of claim 109, wherein the irradiated luminescent material comprises an organic material.

119. The system of claim 109, wherein the absorber is wedge shaped.

120. The system of claim 109, wherein the absorber in incremental step shaped.

121. The system of claim 109, wherein the absorber is made of two or more materials having different absorption characteristics.

\* \* \* \* \*